(12) United States Patent
Wang et al.

(10) Patent No.: US 12,284,041 B2
(45) Date of Patent: Apr. 22, 2025

(54) APPARATUS AND METHOD FOR SEMI-PERSISTENT SCHEDULING

(71) Applicant: Samsung Electronics Co., Ltd., Suwon-si (KR)

(72) Inventors: Yi Wang, Beijing (CN); Feifei Sun, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 17/593,946

(22) PCT Filed: Mar. 27, 2020

(86) PCT No.: PCT/KR2020/004216
§ 371 (c)(1),
(2) Date: Sep. 28, 2021

(87) PCT Pub. No.: WO2020/204491
PCT Pub. Date: Oct. 8, 2020

(65) Prior Publication Data
US 2022/0149997 A1    May 12, 2022

(30) Foreign Application Priority Data

Mar. 29, 2019  (CN) .......................... 201910253351.6
Apr. 30, 2019  (CN) .......................... 201910363684.4
Sep. 27, 2019  (CN) .......................... 201910924941.7

(51) Int. Cl.
*H04L 1/1822*  (2023.01)
*H04L 1/1829*  (2023.01)
(Continued)

(52) U.S. Cl.
CPC .......... *H04L 1/1822* (2013.01); *H04L 1/1864* (2013.01); *H04L 1/1887* (2013.01);
(Continued)

(58) Field of Classification Search
CPC ... H04L 1/1822; H04L 1/1864; H04L 1/1887; H04L 5/0053; H04L 5/0082;
(Continued)

(56) References Cited

U.S. PATENT DOCUMENTS 11,101,943 B2    8/2021  Fu et al.
2019/0082454 A1  3/2019  Shi et al.
(Continued)

FOREIGN PATENT DOCUMENTS

CN    102781111 A    11/2012
CN    108306720 A     7/2018
(Continued)

OTHER PUBLICATIONS

International Search Report and Written Opinion of the International Searching Authority dated Jul. 14, 2020 in connection with International Application No. PCT/KR2020/004216, 9 pages.
(Continued)

*Primary Examiner* — Mandish K Randhawa

(57) ABSTRACT

The disclosure relates to a pre-5th-generation (5G) or 5G communication system to be provided for supporting higher data rates beyond 4th-generation (4G) communication system such as long term evolution (LTE). The disclosure provide a semi-persistent scheduling method, a base station device and a user equipment, wherein, the semi-persistent scheduling method comprises: transmitting a configuration information of semi-persistent scheduling parameters to a user equipment (UE), so that the UE performs a semi-persistent scheduling data transmission based on the configuration information; and performing the semi-persistent scheduling data transmission based on the configuration information of the semi-persistent scheduling parameters. By the method in the embodiments of the present application, the low-latency requirements of the URLLC (ultra-
(Continued)

reliable low-latency communication) is satisfied, so that existing semi-persistent scheduling transmission mechanism can support higher low-latency requirements, and introduce multiple semi-persistent scheduling configuration at the same time and assign different time-frequency resources for each semi-persistent scheduling configuration, thus finally multiple types of services can be simultaneously supported.

10 Claims, 8 Drawing Sheets

(51) Int. Cl.
  *H04L 1/1867* (2023.01)
  *H04L 5/00* (2006.01)
  *H04W 72/23* (2023.01)
  *H04L 1/1812* (2023.01)
(52) U.S. Cl.
  CPC .......... *H04L 5/0053* (2013.01); *H04L 5/0082* (2013.01); *H04L 5/0091* (2013.01); *H04W 72/23* (2023.01); *H04L 1/1812* (2013.01)
(58) Field of Classification Search
  CPC ... H04L 5/0091; H04L 1/1812; H04L 5/0035; H04L 5/0012; H04L 5/0023; H04W 72/23
  See application file for complete search history.

(56) References Cited

U.S. PATENT DOCUMENTS

2021/0314982 A1* 10/2021 Panteleev ............. H04L 5/0053
2022/0007411 A1* 1/2022 Takeda .................. H04W 76/30

FOREIGN PATENT DOCUMENTS

KR  10-2019-0032167 A  3/2019
WO     2019028276 A1   2/2019

OTHER PUBLICATIONS

Huawei, et al., "Detailed design on multiple active configurations for configured grant transmission," R1-1903080, 3GPP TSG RAN WG1 Meeting #96, Athens, Greece, Feb. 25-Mar. 1, 2019, 4 pages.
Nokia, et al., "On Configured Grant enhancements for NR URLLC," R1-1903502 Revision of R1-1901952), 3GPP TSG RAN WG1 Meeting #96, Athens, Greece, Feb. 25-Mar. 1, 2019, 9 pages.
Vivo, "Enhanced UL grant-free transmission for URLLC," R1-1901697, 3GPP TSG RAN WG1 #96, Athens, Greece, Feb. 25-Mar. 1, 2019, 7 pages.
Supplementary European Search Report dated Nov. 14, 2022, in connection with European Application No. 20784902.7, 10 pages.
CMCC, "Outstanding Issues for multiple SPSs/CGs Support," R2-1902551, 3GPP TSG-RAN WG2 #105, Athens, Greece, Feb. 25-Mar. 1, 2019, 7 pages.
NTT Docomo, Inc., "Enhanced UL transmission with configured grant for URLLC," R1-1813329, 3GPP TSG RAN WG1 Meeting #95, Spokane, USA, Nov. 12-16, 2018, 16 pages.
Communication pursuant to Article 94(3) EPC dated Sep. 16, 2024, in connection with European Application No. 20784902.7, 8 pages.
3GPP TS 36.523-1 V15.3.0 (2018-09), Technical Specification, 3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 15), Sep. 2018, 43 pages.
First Examination Opinion Notice dated Feb. 22, 2025, in connection with Chinese Patent Application No. 201910924941.7, 11 pages.

* cited by examiner

[Fig. 1]
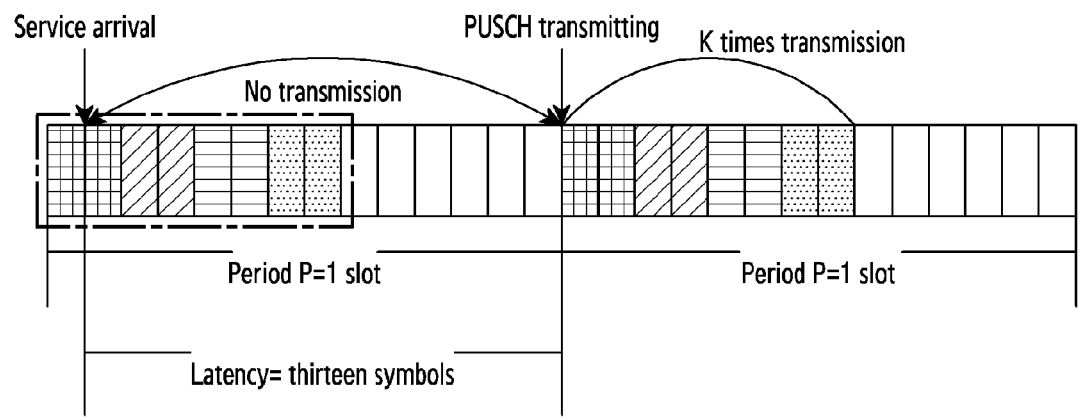
[Fig. 2]
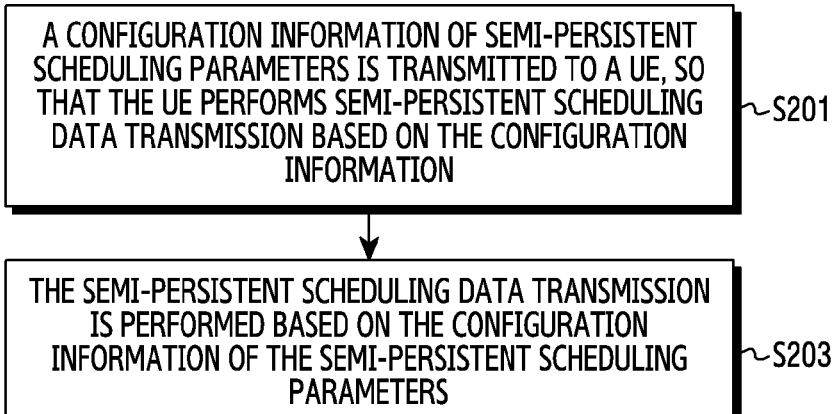

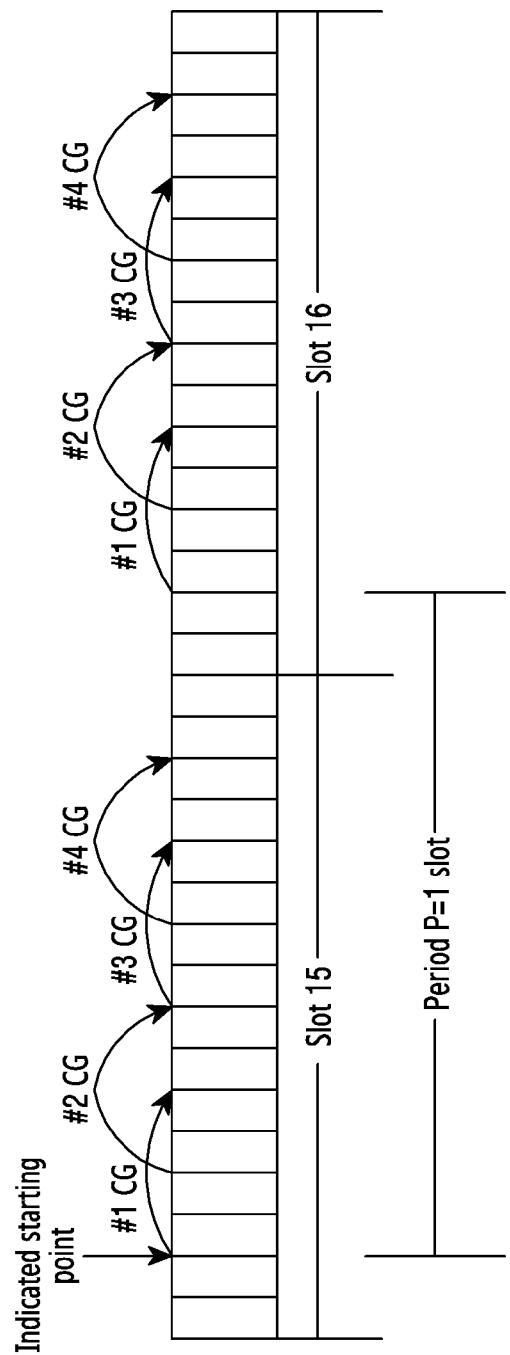
[Fig. 3]

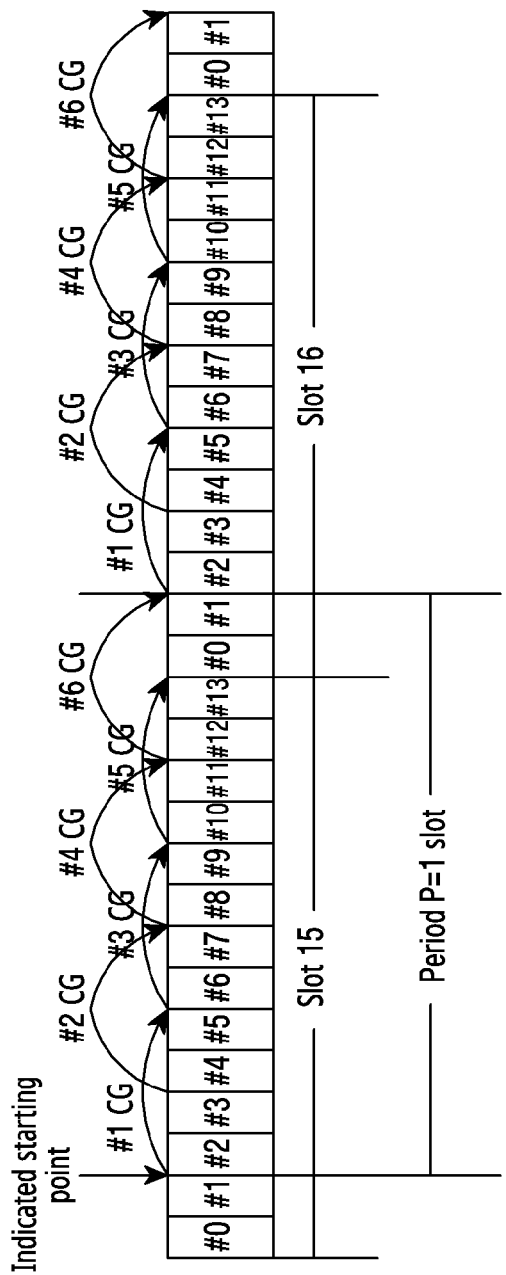
[Fig. 4]

[Fig. 5]
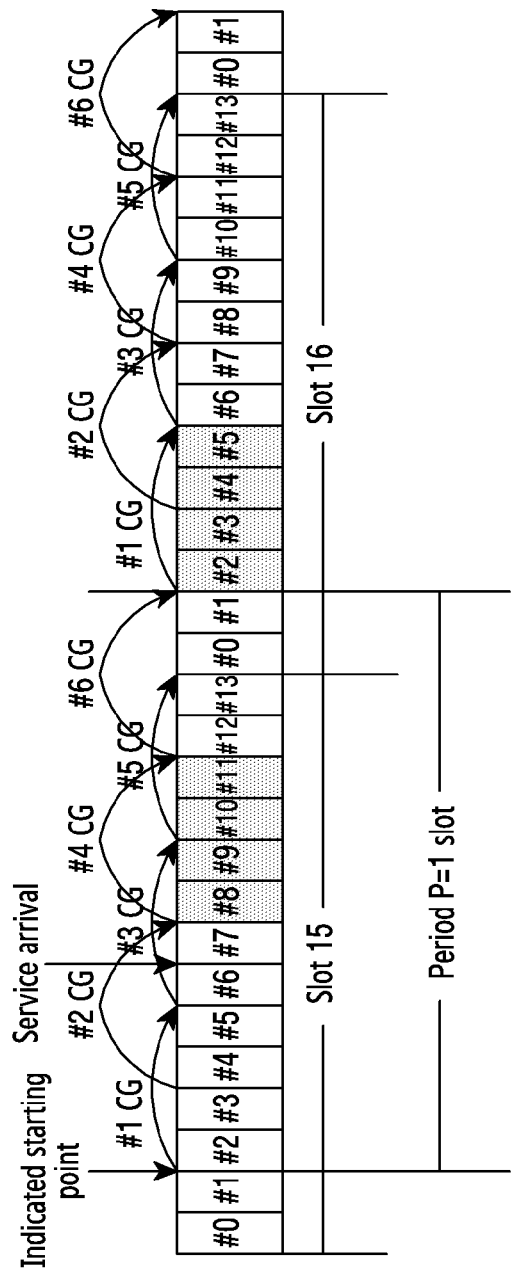
[Fig. 6]
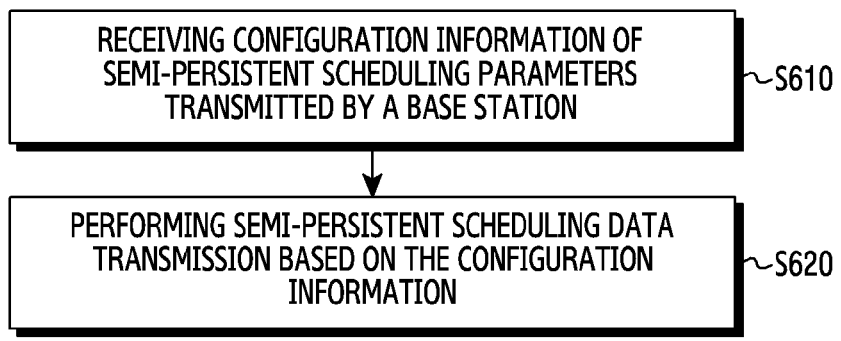

[Fig. 7]
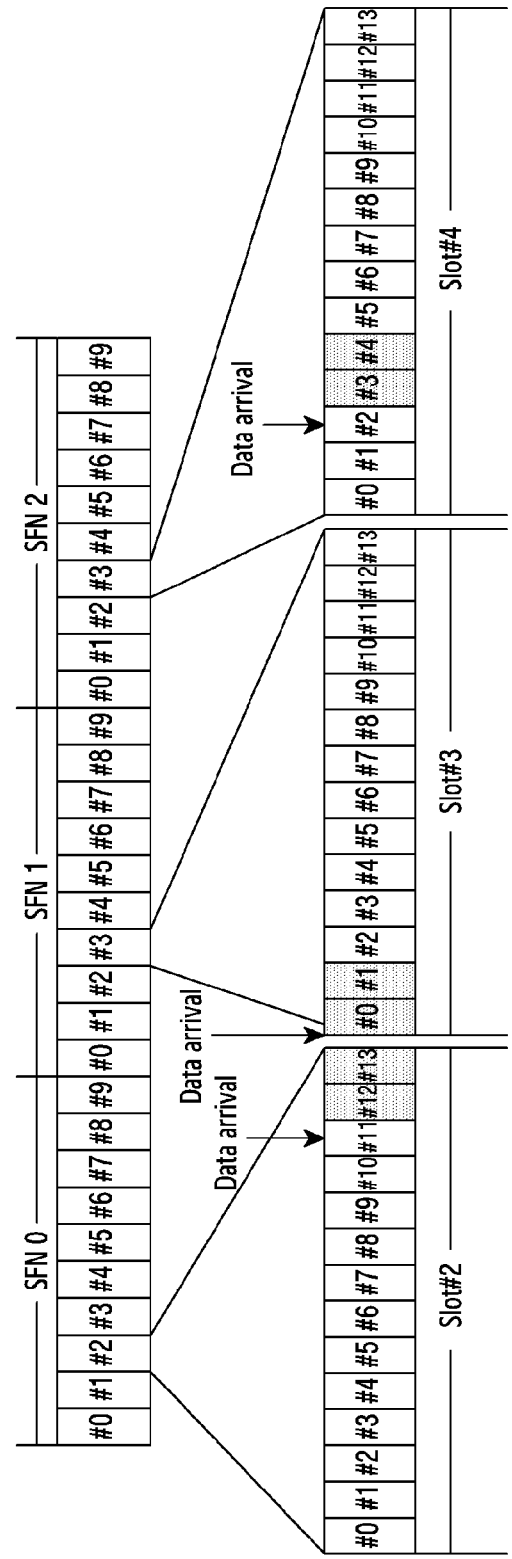

[Fig. 8]
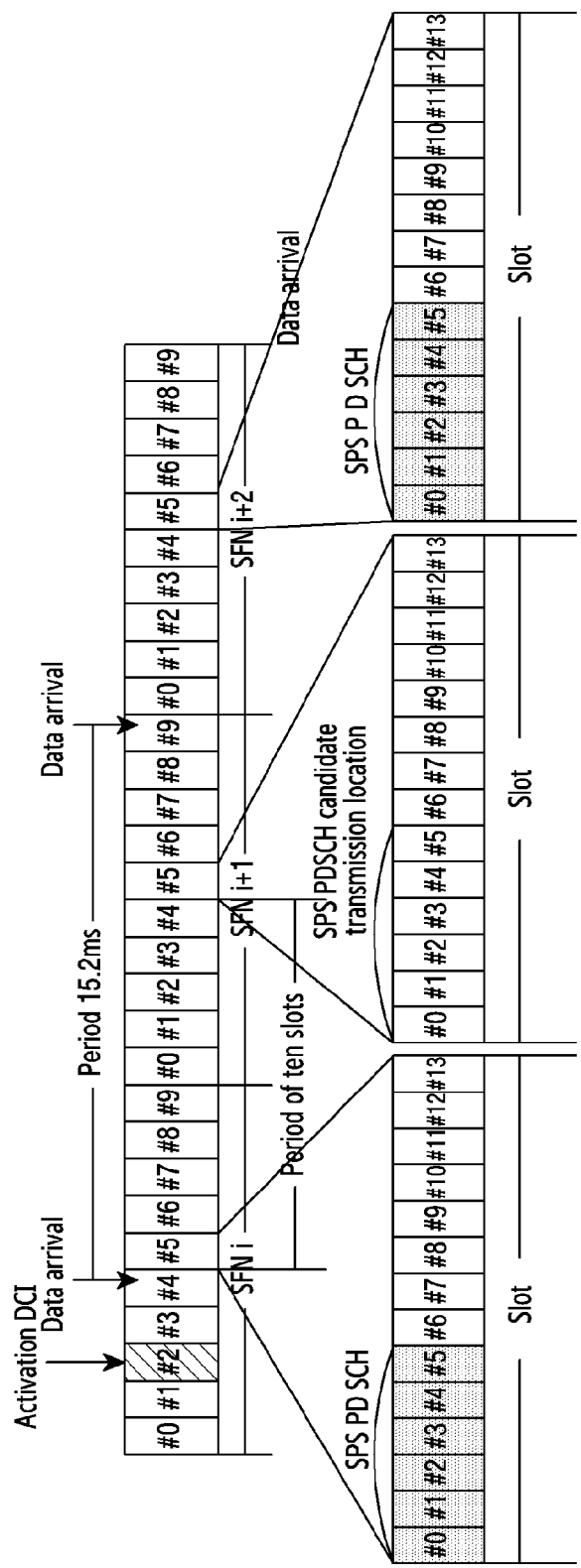

[Fig. 9]
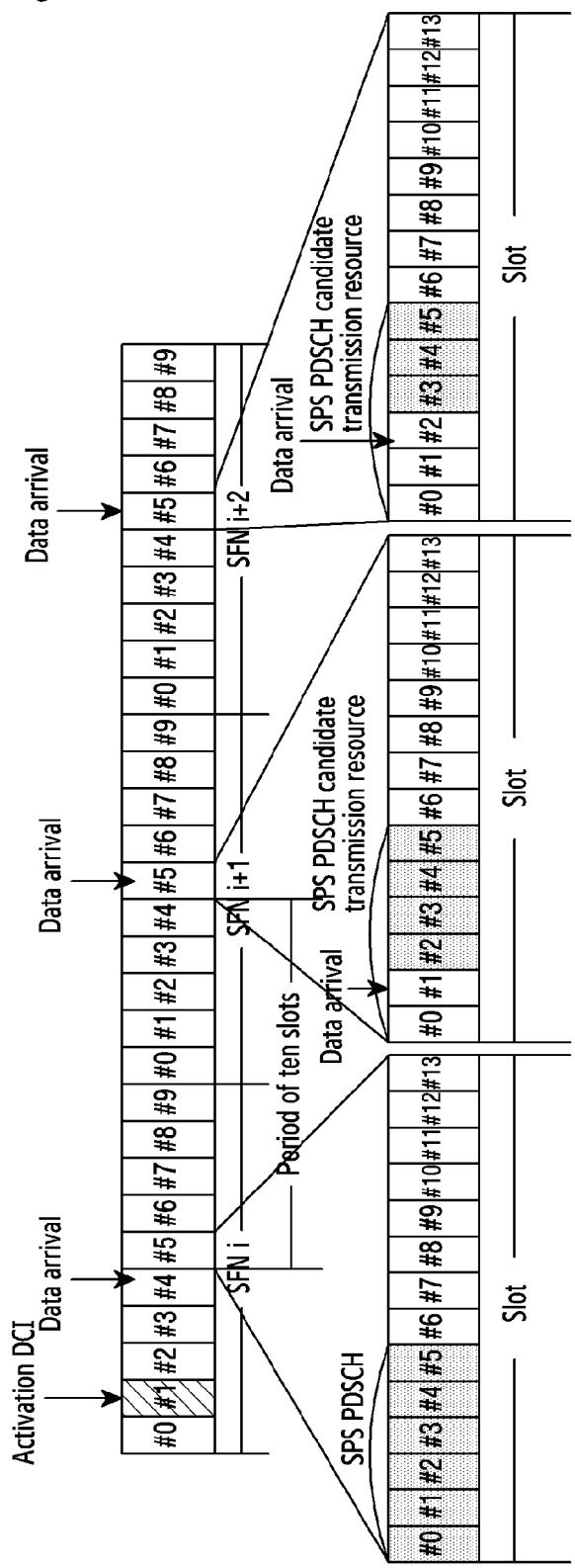

[Fig. 10]
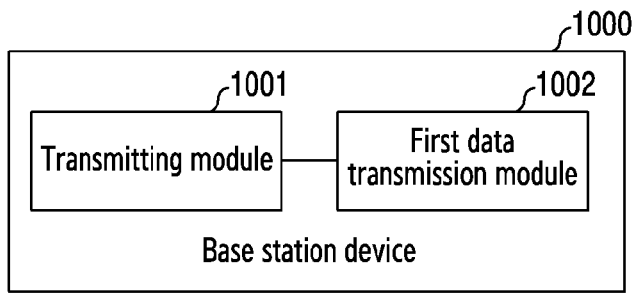
[Fig. 11]
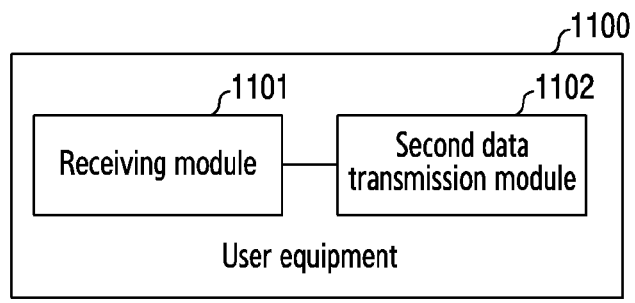
[Fig. 12]
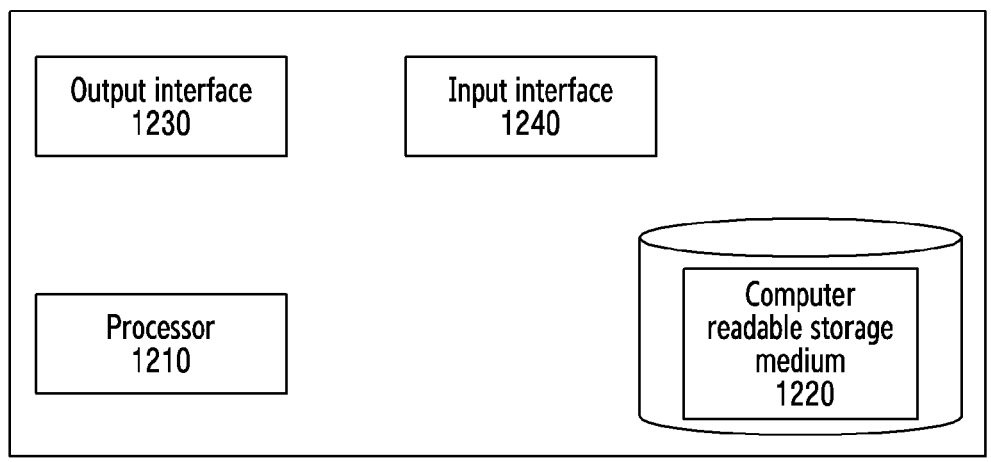

APPARATUS AND METHOD FOR SEMI-PERSISTENT SCHEDULING

CROSS-REFERENCE TO RELATED APPLICATIONS

This application is a 371 National Stage of International Application No. PCT/KR2020/004216, filed on Mar. 27, 2020, which claims priority to Chinese Patent Application No. 201910253351.6, filed Mar. 29, 2019, Chinese Patent Application No. 201910363684.4, filed Apr. 30, 2019, and Chinese Patent Application No. 201910924941.7, filed Sep. 27, 2019, the disclosures of which are herein incorporated by reference in their entirety.

BACKGROUND

1. Field

The present disclosure relates to the field of wireless communication technologies, and in particular, to a semi-persistent scheduling method, a base station device, and a user equipment.

2. Description of the Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G Network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The ultra-reliable low-latency communication (URLLC) proposed in 5G puts forward the requirements for both latency and reliability. 3GPP Rel-15 can support end-to-end latency being less than 1 ms and block error rate of 10-5. With the growth of Industry Internet of things, AR and VR, more stringent requirements have been put forward for URLLC. For example, 3GPP Rel-16 has studied the higher-required URLLC, which requires to support end-to-end latency of 0.5 ms~1 ms and block error rate of 10-6. This proposes a challenge to the NR communication system. At present, the method based on Semi-persistent Scheduling (SPS) for transmission of the NR system, which also referred as a method based on configured grant (CG) for transmission, is an important way for supporting URLLC services. In the existing NR system research, the minimum period of downlink SPS is 10 ms, and it is obviously difficult to meet the latency requirement of 0.5 ms~1 ms. The minimum period of the uplink CG transmission may be 2 symbols, but the time resource length that can be used for K consecutive CG transmissions (K is the repetition times) cannot be greater than the period of the CG transmission. For example, if the base station configures the period P of the CG transmission as 7 symbols, and assumes that the time length of the one PUSCH transmission is 2 symbols, the base station can configure K=3 repetitions at most, so that the time domain duration of the K CG PUSCHs is not more than the period. In addition, the uplink CG transmission also defines that the starting location of one CG transmission is related to the RV. For example, the UE can only start uplink transmission at a transmission occasion (TO) with an RV of zero. If the RV sequence configured by the base station is {0, 0, 0, 0}, the UE can start transmission at any TO in the configured CG resource, and the waiting latency is small. However, if the RV sequence configured by the base station is {0, 2, 3, 1}, the UE can only start transmission every 3 TO intervals, and the waiting latency is relatively extended. If the period P is large, as shown in FIG. 1, there is the CG transmission period P=1 slot, the RV sequence being {0, 2, 3, 1}, K=4, and each CG PUSCH occupying 2 symbols. The UE's uplink service arrival time is the second symbol in the first period, the UE waits until the first TO of the next period to start transmission, and introduces a latency of 13 symbols, which cannot meet the low latency demand of the URLLC. How to improve the existing CG transmission mechanism to support higher low latency requirements is a problem to be solved.

In addition, in the existing NR system, only one SPS configuration/CG configuration is supported, and it is obviously difficult to support the URLLC requirements of multiple services. For example, in Industry Internet of Things, a terminal may support both the monitoring sensor and the robotic arm. These URLLC service characteristics are different, such as the demand of latency and traffic. To support multiple services at the same time, multiple SPS configuration can be introduced to assign different time-frequency domain resources for each SPS configuration. How to efficiently and flexibly configure and schedule multiple SPS configurations is also a problem to be solved.

SUMMARY

An objective of the present application aims at solving at least the above described technical defects, and the present application proposes the following technical solutions:

The disclosure provides a semi-persistent scheduling method, a base station device, and a user equipment.

In a first aspect, a semi-persistent scheduling method is provided, comprising:
  transmitting a configuration information of semi-persistent scheduling parameters to a user equipment (UE), so that the UE performs semi-persistent scheduling data transmission based on the configuration information; and
  performing the semi-persistent scheduling data transmission based on the configuration information of the semi-persistent scheduling parameters.

Specifically, the transmitting configuration information of semi-persistent scheduling parameters to UE, comprises:

transmitting a high-level signaling to the UE, wherein the high-level signaling includes at least one set of semi-persistent scheduling and semi-persistent scheduling parameters corresponding to each set of semi-persistent scheduling; and transmitting a physical layer signaling to the UE, wherein the physical layer signaling is used to indicate at least one of the following: at least one set of semi-persistent scheduling and one of multiple sets of semi-persistent scheduling parameters of each set of semi-persistent scheduling, activation and/or deactivation of multiple sets of semi-persistent scheduling.

Further, the high-level signaling includes at least one of the following: the number of semi-persistent scheduling, an index of semi-persistent scheduling, the number of semi-persistent scheduling parameters corresponding to each set of semi-persistent scheduling, an index of activated semi-persistent scheduling, and activated semi-persistent scheduling parameters.

Further, the physical layer signaling is used to indicate to activate multiple sets of semi-persistent scheduling, the number of semi-persistent scheduling parameters corresponding to each set of semi-persistent scheduling is 2X, wherein X is used to indicate the number of bits of semi-persistent scheduling parameters of the set of semi-persistent scheduling in the physical layer signaling; or, the physical layer signaling is used to indicate to activate and/or deactivate multiple sets of semi-persistent scheduling, the number of semi-persistent scheduling parameters corresponding to each set of semi-persistent scheduling is 2X−1, wherein X is used to indicate the number of bits of semi-persistent scheduling parameters of the set of semi-persistent scheduling in the physical layer signaling, and a predetermined value of the X bits represents to deactivate the set of semi-persistent scheduling, and the remaining values of the X bits represent to activate one set of the semi-persistent scheduling parameters of the set of semi-persistent scheduling.

Further, the configuration information of the semi-persistent parameters comprises one of the followings:

multiple sets of semi-persistent scheduling, common parameters of the multiple sets of semi-persistent scheduling, and time domain resources corresponding to each set of semi-persistent scheduling;

multiple sets of semi-persistent scheduling, common parameters of the multiple sets of semi-persistent scheduling, a time offset between sets of semi-persistent scheduling, and a number and/or index of the multiple sets of semi-persistent scheduling, wherein a time characteristic parameter in the common parameters is applied to a first set of semi-persistent scheduling among the multiple sets of semi-persistent scheduling;

multiple sets of semi-persistent scheduling, common parameters of the multiple sets of semi-persistent scheduling, and a time offset between sets of semi-persistent scheduling, wherein a time characteristic parameter in the common parameters is applied to a first set of semi-persistent scheduling among the multiple sets of semi-persistent scheduling; and a set of semi-persistent scheduling, common parameters of the set of semi-persistent scheduling, and a time offset between candidate transmission locations of the set of semi-persistent scheduling, wherein a time characteristic parameter in the common parameters is applied to a first candidate transmission location of the set of semi-persistent scheduling.

Further, the method further comprises any of the followings:

when the physical layer signaling includes a time domain resource indication information applied to the first candidate transmission location of the set of semi-persistent scheduling, and a time offset between candidate transmission locations, the time domain resource indication information is jointly encoded with the time offset;

when the physical layer signaling includes a time domain resource indication information applied to the first set of semi-persistent scheduling among the multiple sets of semi-persistent scheduling, and a time offset between sets of semi-persistent scheduling, the time domain resource indication information is jointly encoded with the time offset;

when the physical layer signaling includes a time domain resource indication information applied to the first candidate transmission location of the set of semi-persistent scheduling, a time offset between candidate transmission locations and a semi-persistent scheduling transmission period, the transmission period is jointly encoded with the time offset between candidate transmission locations, or the transmission period, the time offset between candidate transmission locations and the time domain resource of the first candidate transmission location are jointly encoded;

when the physical layer signaling includes a time domain resource indication information applied to the first set of semi-persistent scheduling among the multiple sets of semi-persistent scheduling, a time offset between sets of semi-persistent scheduling and a transmission period of semi-persistent scheduling, the transmission period is jointly encoded with the time offset between sets of semi-persistent scheduling, or the transmission period, the time offset between sets of semi-persistent scheduling, and the time domain resource of the first set of semi-persistent scheduling are jointly encoded.

Further, the method further comprises, indicating the time offset between the sets of semi-persistent scheduling and/or the transmission period of the semi-persistent scheduling, or indicating the time offset between the candidate transmission locations and/or the transmission period of semi-persistent scheduling, by at least one of the following bit fields in the physical layer signaling:

a bit field indicating a redundancy version;
a bit field indicating an HARQ process number; and
an independent bit field.

Further, the performing semi-persistent scheduling data transmission based on the configuration information of the semi-persistent scheduling parameters comprises:

in a semi-persistent scheduling transmission period, attempting to perform semi-persistent scheduling data transmission on resources of at least one set of semi-persistent scheduling, and determining to perform semi-persistent scheduling data transmission on resources of one set of semi-persistent scheduling; or in a semi-persistent scheduling transmission period, attempting to perform semi-persistent scheduling data transmission on at least one candidate transmission location of one set of semi-persistent scheduling, and determining to perform semi-persistent scheduling data transmission on one candidate transmission location.

Further, the method further comprises any of the followings:
  when performing the semi-persistent scheduling data transmission on resources of a set of semi-persistent scheduling in a semi-persistent scheduling transmission period, calculating a HARQ process number according to the resources of earliest set of semi-persistent scheduling in the semi-persistent scheduling transmission period, or calculating a HARQ process number according to the resources of semi-persistent scheduling occupied by the semi-persistent scheduling data actually transmitted in the semi-persistent scheduling transmission period; and
  when performing the semi-persistent scheduling data transmission on a candidate transmission location of a set of semi-persistent scheduling in a semi-persistent scheduling transmission period, calculating a HARQ process number according to a starting point of earliest candidate transmission location in the semi-persistent scheduling transmission period, or calculating a HARQ process number according to a starting point of the candidate transmission location occupied by the semi-persistent scheduling data actually transmitted in the semi-persistent scheduling transmission period.

Further, the method further comprises:
indicating a part or all of the multiple sets of semi-persistent scheduling to be deactivated, by at least one following bit field in the physical layer signaling:
a time domain resource assignment bit field; a mapping bit field of a virtual resource block to a physical resource; a HARQ process number bit field; a redundancy version bit field; a modulation coding scheme bit field; a frequency domain resource assignment bit field; a hybrid automatic repeat request acknowledgement timing (HARQ-ACK timing) bit field.

Further, the method further comprises:
performing any one operation of activating semi-persistent scheduling, deactivating semi-persistent scheduling, and modifying semi-persistent scheduling parameters on multiple UEs by a pre-configured physical layer signaling,
  wherein the multiple UEs have a same pre-configured Radio Network Temporary Identity (RNTI), and the pre-configured physical layer signaling includes a bit corresponding to each of the multiple UEs, wherein the bit is used to indicate the semi-persistent scheduling and semi-persistent scheduling parameters corresponding to the UE.

Further, the performing any one operation of activating semi-persistent scheduling, deactivating semi-persistent scheduling, and modifying semi-persistent scheduling parameters on multiple UEs by a pre-configured physical layer signaling, comprises:
  there is at least one first bit field indicating the common resource information of the multiple UEs in the pre-configured physical layer signaling, and at least one second bit field indicating the predetermined resource information corresponding to each of the multiple UEs,
  wherein any one of the UEs occupies at least X bits in the second bit field, the X bits indicating 2X or 2X−1 sets of semi-persistent scheduling parameters, and when the X bits indicates 2X−1 sets of semi-persistent scheduling parameters, a predetermined state value of the X bits represents the deactivation of semi-persistent scheduling.

Further, when the physical layer signaling includes: a predetermined bit field, or a predetermined value of a predetermined bit field in the physical layer signaling, the physical layer signaling is used to indicate at least one of: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling; or
  configuring different RNTIs for the physical layer signaling and another physical layer signaling; or
  configuring different PDCCH search spaces and/or control resource sets (CORESET) for the physical layer signaling and another physical layer signaling.

Further, the performing semi-persistent scheduling data transmission based on the configuration information of the semi-persistent scheduling parameters, comprises:
  the configuration information including a time information having a time unit, determining a location for the data transmission according to the time information, and performing semi-persistent scheduling data transmission, wherein the time unit includes at least one of the following: second, millisecond, microsecond, femtosecond, nanosecond and picosecond.

Further, the configuration information including a time information having a time unit, determining a location for the data transmission according to the time information, and performing semi-persistent scheduling data transmission comprises any one of the following situations:
  determining a data arrival time of the semi-persistent scheduling according to the configuration information, determining a data transmission symbol that is not earlier than the data arrival time and nearest to the data arrival time, and performing the semi-persistent scheduling data transmission by using the data transmission symbol as a starting point;
  determining a data arrival time and a candidate transmission location of the semi-persistent scheduling according to the configuration information, determining a candidate transmission location that is not earlier than the data arrival time and nearest to the data arrival time, and performing the semi-persistent scheduling data transmission at the candidate transmission location that is not earlier than the data arrival time and nearest to the data arrival time;
  determining the data arrival time, the candidate transmission location, and the candidate transmission resource of the semi-persistent scheduling according to the configuration information, determining a data transmission symbol that is not earlier than the data arrival time and nearest to the data arrival time, in the candidate transmission resource, and performing semi-persistent scheduling data transmission starting from the data transmission symbol to an end symbol of a candidate transmission location where the data transmission symbol is located;
  determining a time window and a data arrival time of the semi-persistent scheduling according to the configuration information, determining a time window in which the semi-persistent scheduling data transmission is possible by using the data arrival time as a starting point, and when there is at least one candidate transmission location in the time window in which the semi-persistent scheduling data transmission is possible, performing the semi-persistent scheduling data transmission at the earliest candidate transmission location; and
  determining a time window and a data arrival time of the semi-persistent scheduling according to the configuration information, determining a time window in which the semi-persistent scheduling data transmission is possible by using the data arrival time as a starting point, and when there is at least one semi-persistent scheduling candidate transmission time domain resource in the time window in which the semi-persistent scheduling data transmission is possible, performing the semi-persistent scheduling data transmission on the earliest semi-persistent scheduling candidate transmission time domain resource.

In the second aspect, a semi-persistent scheduling method is provided, comprising:
receiving a configuration information of semi-persistent scheduling parameters transmitted by a base station; and
performing the semi-persistent scheduling data transmission based on the configuration information.

Specifically, receiving the configuration information of semi-persistent scheduling parameters transmitted by a base station, comprises:
receiving a high-level signaling transmitted by the base station, wherein the high-level signaling includes at least one set of semi-persistent scheduling and semi-persistent scheduling parameters corresponding to each set of semi-persistent scheduling; and
receiving a physical layer signaling transmitted by the base station, wherein the physical layer signaling is used to indicate at least one of the followings: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling.

Further, performing the semi-persistent scheduling data transmission based on the configuration information comprises: determining at least one of the following: the number of semi-persistent scheduling, an index of semi-persistent scheduling, the number of semi-persistent scheduling parameters corresponding to each set of semi-persistent scheduling, an index of activated semi-persistent scheduling, and activated semi-persistent scheduling parameters, according to the high-level signaling.

Further, performing the semi-persistent scheduling data transmission based on the configuration information comprises:
determining to activate multiple sets of semi-persistent scheduling and semi-persistent scheduling parameters of each set of semi-persistent scheduling according to the physical layer singling, and performing the semi-persistent data transmission according to the semi-persistent scheduling parameters, wherein the number of semi-persistent scheduling parameters corresponding to each set of semi-persistent scheduling is 2X, wherein X is used to indicate the number of bits of semi-persistent scheduling parameters of the set of semi-persistent scheduling in the physical layer signaling; or,
determining to activate or deactivate multiple sets of semi-persistent scheduling and semi-persistent scheduling parameters of each set of semi-persistent scheduling according to the physical layer signaling and performing the semi-persistent data transmission according to the semi-persistent scheduling parameters, wherein the number of semi-persistent scheduling parameters corresponding to each set of semi-persistent scheduling is 2X−1, wherein X is used to indicate the number of bits of semi-persistent scheduling parameters of the set of semi-persistent scheduling in the physical layer signaling, and a predetermined value of the X bits represents to deactivate the set of semi-persistent scheduling, and the remaining values of the X bits represent to activate one set of the semi-persistent scheduling parameters of the set of semi-persistent scheduling.

Further, the configuration information of the semi-persistent parameters comprises any of the followings:
multiple sets of semi-persistent scheduling, common parameters of the multiple sets of semi-persistent scheduling, and time domain resources corresponding to each set of semi-persistent scheduling;
multiple sets of semi-persistent scheduling, common parameters of the multiple sets of semi-persistent scheduling, a time offset between sets of semi-persistent scheduling, and number and/or index of the multiple sets of semi-persistent scheduling, wherein a time characteristic parameter in the common parameters is applied to a first set of semi-persistent scheduling in the multiple sets of semi-persistent scheduling;
multiple sets of semi-persistent scheduling, common parameters of the multiple sets of semi-persistent scheduling, and a time offset between sets of semi-persistent scheduling, wherein a time characteristic parameter in the common parameters is applied to a first set of semi-persistent scheduling in the multiple sets of semi-persistent scheduling;
a set of semi-persistent scheduling, common parameters of the set of semi-persistent scheduling, and a time offset between candidate transmission locations of the set of semi-persistent scheduling, wherein a time characteristic parameter in the common parameters is applied to a first candidate transmission location of the set of semi-persistent scheduling.

Further, the method further comprises any of the followings:
receiving joint encoding of the time domain resource indication information and the time offset between candidate transmission locations, wherein the physical layer signaling includes a time domain resource indication information applied to the first candidate transmission location of the set of semi-persistent scheduling, and a time offset between candidate transmission locations;
receiving joint encoding of the time domain resource indication information and the time offset between sets of semi-persistent scheduling, wherein the physical layer signaling includes a time domain resource indication information applied to the first set of semi-persistent scheduling among the multiple sets of semi-persistent scheduling, and a time offset between sets of semi-persistent scheduling;
receiving joint encoding of the transmission period and the time offset between candidate transmission locations, or receiving joint encoding of the transmission period, the time offset between candidate transmission locations and the time domain resource of the first candidate transmission location, wherein the physical layer signaling includes a time domain resource indication information applied to the first candidate transmission location of the set of semi-persistent scheduling, a time offset between candidate transmission locations and a semi-persistent scheduling transmission period; and
receiving joint encoding of the transmission period and the time offset between sets of semi-persistent scheduling, or receiving joint encoding of the transmission period, the time offset between sets of semi-persistent scheduling and the time domain resource of the first set of semi-persistent scheduling, wherein the physical layer signaling includes a time domain resource indication information applied to the first set of semi-persistent scheduling among the multiple sets of semi-persistent scheduling, a time offset between sets of semi-persistent scheduling and a semi-persistent scheduling transmission period.

Further, the method further comprises:

determining the time offset between the sets of semi-persistent scheduling and/or the transmission period of the semi-persistent scheduling, or determining the time offset between the candidate transmission locations and/or the transmission period of semi-persistent scheduling, according to at least one of the following bit fields in the physical layer signaling:

a bit field indicating a redundancy version;
a bit field indicating an HARQ process number; and
an independent bit field.

Further, performing the semi-persistent scheduling data transmission based on the configuration information comprises:

in a semi-persistent scheduling transmission period, attempting to perform the semi-persistent scheduling data transmission on resources of at least one set of semi-persistent scheduling, and determining to perform the semi-persistent scheduling data transmission on resources of one set of semi-persistent scheduling; or in a semi-persistent scheduling transmission period, attempting to perform the semi-persistent scheduling data transmission on at least one candidate transmission location of one set of semi-persistent scheduling, and determining to perform the semi-persistent scheduling data transmission on one candidate transmission location.

Further, the method further comprises any of the followings:

when performing the semi-persistent scheduling data transmission on resources of a set of semi-persistent scheduling in a semi-persistent scheduling transmission period, calculating a HARQ process number according to the resources of earliest set of semi-persistent scheduling in the semi-persistent scheduling transmission period, or calculating a HARQ process number according to the resources of semi-persistent scheduling occupied by the semi-persistent scheduling data actually transmitted in the semi-persistent scheduling transmission period; and when performing the semi-persistent scheduling data transmission on a candidate transmission location of a set of semi-persistent scheduling in a semi-persistent scheduling transmission period, calculating a HARQ process number according to a starting point of earliest candidate transmission location in the semi-persistent scheduling transmission period, or calculating a HARQ process number according to a starting point of the candidate transmission location occupied by the semi-persistent scheduling data actually transmitted in the semi-persistent scheduling transmission period.

Further, the method further comprises:

deactivating a part or all of the multiple sets of semi-persistent scheduling to be deactivated, according to the part or all of the multiple sets of semi-persistent scheduling to be deactivated indicated by at least one following bit field in the physical layer signaling:

a time domain resource assignment bit field; a mapping bit field of virtual resource block to physical resource; a HARQ process number bit field; a redundancy version bit field; modulation coding scheme bit field; a frequency domain resource assignment bit field; a hybrid automatic repeat request acknowledgement timing (HARQ-ACK timing) bit field.

Further, the method further comprises:

performing any one operation of activating the semi-persistent scheduling, deactivating the semi-persistent scheduling, and modifying the semi-persistent scheduling parameters on a UE according to a pre-configured physical layer signaling transmitted by the base station, wherein the UE has a pre-configured Radio Network Temporary Identity (RNTI), and the pre-configured physical layer signaling includes a bit corresponding to the UE, wherein the bit is used to indicate the semi-persistent scheduling and the semi-persistent scheduling parameters corresponding to the UE.

Further, in the pre-configured physical layer signaling, there is at least one first bit field indicating common resource information of the UEs and at least one second bit field indicating predetermined resource information corresponding to the UE, wherein the UE occupies at least X bits in the second bit field, the X bits indicating 2X or 2X−1 sets of semi-persistent scheduling parameters, and when the X bits indicates 2X−1 sets of semi-persistent scheduling parameters, a predetermined state value of the X bits represents the deactivation of semi-persistent scheduling.

Further, determining at least one of the followings according to the physical layer signaling: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling, wherein, the physical layer signaling includes: a predetermined bit field, or a predetermined value of a predetermined bit field in the physical layer signaling; or determining a physical layer signaling whose RNTI is different from that of another physical layer signaling; or determining a physical layer signaling whose PDCCH search space and/or control resource set (CORESET) is different from that of another physical layer signaling.

Further, performing the semi-persistent scheduling data transmission based on the configuration information of the semi-persistent scheduling parameters, comprises:

the configuration information including time information having a time unit, determining a location for the data transmission according to the time information, and performing the semi-persistent scheduling data transmission, wherein the time unit includes at least one of the following: second, millisecond, microsecond, femtosecond, nanosecond and picosecond.

Further, the configuration information including a time information having a time unit, determining a location for the data transmission according to the time information, and performing the semi-persistent scheduling data transmission comprises any of the following situations:

determining a data arrival time of the semi-persistent scheduling according to the configuration information, determining a data transmission symbol that is not earlier than the data arrival time and nearest to the data arrival time, and performing the semi-persistent scheduling data transmission by using the data transmission symbol as a starting point;

determining a data arrival time and a candidate transmission location of the semi-persistent scheduling according to the configuration information, determining a candidate transmission location that is not earlier than the data arrival time and nearest to the data arrival time, and performing the semi-persistent scheduling data transmission at the candidate transmission location that is not earlier than the data arrival time and nearest to the data arrival time;

determining the data arrival time, the candidate transmission location, and the candidate transmission resource of the semi-persistent scheduling according to the configuration information, determining a data transmission symbol that is not earlier than the data arrival time and nearest to the data arrival time, in the candidate transmission resource, and performing the semi-persistent scheduling data transmission starting from the data transmission symbol to an end symbol of a candidate transmission location where the data transmission symbol is located;

determining a time window and a data arrival time of the semi-persistent scheduling according to the configuration information, determining a time window in which semi-persistent scheduling data transmission is possible by using the data arrival time as a starting point, and when there is at least one candidate transmission location in the time window in which the semi-persistent scheduling data transmission is possible, performing the semi-persistent scheduling data transmission at the earliest candidate transmission location; and determining a time window and a data arrival time of the semi-persistent scheduling according to the configuration information, determining a time window in which semi-persistent scheduling data transmission is possible by using the data arrival time as a starting point, and when there is at least one semi-persistent scheduling candidate transmission time domain resource in the time window in which the semi-persistent scheduling data transmission is possible, performing the semi-persistent scheduling data transmission on the earliest semi-persistent scheduling candidate transmission time domain resource.

In a third aspect, a base station device is provided, comprising:

a transmitting module, configured to transmit a configuration information of semi-persistent scheduling parameters to a user equipment (UE), so that the UE performs the semi-persistent scheduling data transmission based on the configuration information; and a first data transmission module, configured to perform the semi-persistent scheduling data transmission based on the configuration information of the semi-persistent scheduling parameters.

In a fourth aspect, a user equipment is provided, comprising:

a receiving module, configured to receive a configuration information of semi-persistent scheduling parameters transmitted by a base station; and a second data transmission module, configured to perform the semi-persistent scheduling data transmission based on the configuration information.

In a fifth aspect, a computer readable storage medium is provided, on which is stored a computer program that, when executed by a processor, implements the semi-static scheduling method described above.

In the semi-persistent scheduling method provided by the embodiment of the present application, by transmitting the configuration information of semi-persistent scheduling parameters to the UE, the UE performs the semi-persistent scheduling data transmission based on the configuration information; and the base station performs the semi-persistent scheduling data transmission based on the configuration information of the semi-persistent scheduling parameters, thereby meeting the low-latency requirements of the URLLC, so that existing semi-persistent scheduling transmission mechanism can support a higher low-latency requirements, and introduce multiple semi-persistent scheduling configurations at the same time and assign different time-frequency resources for each semi-persistent scheduling configuration, thus finally multiple types of services can be simultaneously supported.

In the semi-persistent scheduling method provided by the various embodiment of the present disclosure, by receiving the configuration information of semi-persistent scheduling parameters transmitted by the base station and performing the semi-persistent scheduling data transmission based on the configuration information, the low-latency requirements of the URLLC is satisfied, so that existing semi-persistent scheduling transmission mechanism can support a higher low-latency requirements, and introduce multiple semi-persistent scheduling configurations at the same time and assign different time-frequency resources for each semi-persistent scheduling configuration, thus finally multiple types of services can be simultaneously supported.

Additional aspects and advantages of the present invention will be partially appreciated and become apparent from the description below, or will be well learned from the practices of the present disclosure.

BRIEF DESCRIPTION OF THE DRAWINGS

The above and/or additional aspects and advantageous of the present invention will become apparent and be more readily appreciated from the following description of embodiments, with reference to the accompanying drawings, in which:

FIG. 1 is a schematic diagram of semi-persistent scheduling in the prior art;

FIG. 2 is a schematic flowchart of a semi-persistent scheduling method according to an embodiment of the present disclosure;

FIG. 3 is a schematic diagram of a semi-persistent scheduling method according to an embodiment of the present disclosure;

FIG. 4 is another schematic diagram of a semi-persistent scheduling method according to an embodiment of the present disclosure;

FIG. 5 is still another schematic diagram of a semi-persistent scheduling method according to an embodiment of the present disclosure;

FIG. 6 is a schematic flowchart of a semi-persistent scheduling method according to another embodiment of the present disclosure;

FIG. 7 is a schematic diagram of data transmission in semi-persistent scheduling according to still another embodiment of the present disclosure;

FIG. 8 is another schematic diagram of data transmission in semi-persistent scheduling according to still another embodiment of the present disclosure;

FIG. 9 is still another schematic diagram of data transmission in semi-persistent scheduling according to still another embodiment of the present disclosure;

FIG. 10 is a schematic diagram of a basic structure of a base station device according to an embodiment of the present disclosure;

FIG. 11 is a schematic diagram of a basic structure of a user equipment according to an embodiment of the present disclosure; and FIG. 12 is a block diagram of a computing system that can be used to implement the user equipment disclosed in the embodiments of the present disclosure.

DETAILED DESCRIPTION

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to make the objects, technical solutions and advantages of the present application clearer, the embodiments of the present application will be further described in detail below with reference to the accompanying drawings.

The technical solutions of the present application and how the technical solutions of the present application solve the above technical problems are described in detail in the following specific embodiments. The following specific embodiments may be combined with each other, and the same or similar concepts or processes may not be described in some embodiments. Embodiments of the present application will be described below with reference to the accompanying drawings.

An embodiment of the present application proposes a semi-persistent scheduling method, as shown in the FIG. 2, comprising:

step S201, transmitting configuration information of semi-persistent scheduling parameters to a user equipment (UE), so that the UE performs semi-persistent scheduling data transmission based on the configuration information;

step S203, performing the semi-persistent scheduling data transmission based on the configuration information of the semi-persistent scheduling parameters.

In the semi-persistent scheduling method provided by the embodiment of the present application, by transmitting configuration information of semi-persistent scheduling parameters to the UE, the UE performs the semi-persistent scheduling data transmission based on the configuration information; and the base station performs the semi-persistent scheduling data transmission based on the configuration information of the semi-persistent scheduling parameters, thereby meeting the low-latency requirements of the URLLC (ultra-reliable low-latency communication), so that existing semi-persistent scheduling transmission mechanism can support a higher low-latency requirements, and introduce multiple semi-persistent scheduling configuration at the same time and assign different time-frequency resources for each semi-persistent scheduling configuration, thus finally multiple types of services can be simultaneously supported.

Specifically, the transmitting configuration information of semi-persistent scheduling parameters to UE, comprises:
transmitting a high-level signaling to the UE, wherein the high-level signaling includes at least one set of semi-persistent scheduling and semi-persistent scheduling parameters corresponding to each set of semi-persistent scheduling; and
transmitting a physical layer signaling to the UE, wherein the physical layer signaling is used to indicate at least one of the following: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling.

Further, the high-level signaling includes at least one of the following: the number of semi-persistent scheduling, an index of semi-persistent scheduling, the number of semi-persistent scheduling parameters corresponding to each set of semi-persistent scheduling, an index of activated semi-persistent scheduling, and activated semi-persistent scheduling parameters.

Further, the physical layer signaling is used to indicate to activate multiple sets of semi-persistent scheduling, the number of semi-persistent scheduling parameters corresponding to each set of semi-persistent scheduling is 2X, wherein X is used to indicate the number of bits of semi-persistent scheduling parameters of the set of semi-persistent scheduling in the physical layer signaling; or, the physical layer signaling is used to indicate to activate and/or deactivate multiple sets of semi-persistent scheduling, the number of semi-persistent scheduling parameters corresponding to each set of semi-persistent scheduling is 2X−1, wherein X is used to indicate the number of bits of semi-persistent scheduling parameters of the set of semi-persistent scheduling in the physical layer signaling, and a predetermined value of the X bits represents to deactivate the set of semi-persistent scheduling, and the remaining values of the X bits represent to activate one set of the semi-persistent scheduling parameters of the set of semi-persistent scheduling.

Further, the configuration information of the semi-persistent parameters comprises any of the followings:
multiple sets of semi-persistent scheduling, common parameters of the multiple sets of semi-persistent scheduling, and time domain resources corresponding to each set of semi-persistent scheduling;
multiple sets of semi-persistent scheduling, common parameters of the multiple sets of semi-persistent scheduling, a time offset between sets of semi-persistent scheduling, and a number and/or index of the multiple sets of semi-persistent scheduling, wherein a time characteristic parameter in the common parameters is applied to a first set of semi-persistent scheduling among the multiple sets of semi-persistent scheduling;

multiple sets of semi-persistent scheduling, common parameters of the multiple sets of semi-persistent scheduling, and a time offset between sets of semi-persistent scheduling, wherein a time characteristic parameter in the common parameters is applied to a first set of semi-persistent scheduling among the multiple sets of semi-persistent scheduling; and a set of semi-persistent scheduling, common parameters of the set of semi-persistent scheduling, and a time offset between candidate transmission locations of the set of semi-persistent scheduling, wherein a time characteristic parameter in the common parameters is applied to a first candidate transmission location of the set of semi-persistent scheduling.

Further, the method further comprises any of the followings:

when the physical layer signaling includes a time domain resource indication information applied to the first candidate transmission location of the set of semi-persistent scheduling, and a time offset between candidate transmission locations, the time domain resource indication information is jointly encoded with the time offset;

when the physical layer signaling includes a time domain resource indication information applied to the first set of semi-persistent scheduling among the multiple sets of semi-persistent scheduling, and a time offset between sets of semi-persistent scheduling, the time domain resource indication information is jointly encoded with the time offset;

when the physical layer signaling includes a time domain resource indication information applied to the first candidate transmission location of the set of semi-persistent scheduling, a time offset between candidate transmission locations and a semi-persistent scheduling transmission period, the transmission period is jointly encoded with the time offset between candidate transmission locations, or the transmission period, the time offset between candidate transmission locations and the time domain resource of the first candidate transmission location are jointly encoded;

when the physical layer signaling includes a time domain resource indication information applied to the first set of semi-persistent scheduling among the multiple sets of semi-persistent scheduling, a time offset between sets of semi-persistent scheduling and a semi-persistent scheduling transmission period, the transmission period is jointly encoded with the time offset between sets of semi-persistent scheduling, or the transmission period, the time offset between sets of semi-persistent scheduling, and the time domain resource of the first set of semi-persistent scheduling are jointly encoded.

Further, the method further comprises, indicating the time offset between the sets of semi-persistent scheduling and/or the transmission period of the semi-persistent scheduling, or indicating the time offset between the candidate transmission locations and/or the transmission period of semi-persistent scheduling, by at least one of the following bit fields in the physical layer signaling:

a bit field indicating a redundancy version;
a bit field indicating an HARQ process number; and
an independent bit field.

Further, performing the semi-persistent scheduling data transmission based on the configuration information of the semi-persistent scheduling parameters comprises:

in a semi-persistent scheduling transmission period, attempting to perform the semi-persistent scheduling data transmission on resources of at least one set of semi-persistent scheduling, and determining to perform the semi-persistent scheduling data transmission on resources of one set of semi-persistent scheduling; or in a semi-persistent scheduling transmission period, attempting to perform the semi-persistent scheduling data transmission on at least one candidate transmission location of one set of semi-persistent scheduling, and determining to perform the semi-persistent scheduling data transmission on one candidate transmission location.

Further, the method further comprises any of the followings:

when performing the semi-persistent scheduling data transmission on resources of a set of semi-persistent scheduling in a semi-persistent scheduling transmission period, calculating a HARQ process number according to the resources of earliest set of semi-persistent scheduling in the semi-persistent scheduling transmission period, or calculating a HARQ process number according to the resources of semi-persistent scheduling occupied by the semi-persistent scheduling data actually transmitted in the semi-persistent scheduling transmission period; and when performing the semi-persistent scheduling data transmission on a candidate transmission location of a set of semi-persistent scheduling in a semi-persistent scheduling transmission period, calculating a HARQ process number according to a starting point of earliest candidate transmission location in the semi-persistent scheduling transmission period, or calculating a HARQ process number according to a starting point of the candidate transmission location occupied by the semi-persistent scheduling data actually transmitted in the semi-persistent scheduling transmission period.

Further, the method further comprises:
indicating a part or all of the multiple sets of semi-persistent scheduling to be deactivated, by at least one following bit field in the physical layer signaling:
a time domain resource assignment bit field; a mapping bit field of virtual resource block to physical resource; a HARQ process number bit field; a redundancy version bit field; modulation coding scheme bit field; a frequency domain resource assignment bit field; a hybrid automatic repeat request acknowledgement timing (HARQ-ACK timing) bit field.

Further, the method further comprises:
performing any one operation of activating the semi-persistent scheduling, deactivating the semi-persistent scheduling, and modifying semi-persistent scheduling parameters on multiple UEs by a pre-configured physical layer signaling,
wherein the multiple UEs have a same pre-configured Radio Network Temporary Identity (RNTI), and the pre-configured physical layer signaling includes a bit corresponding to each of the multiple UEs, wherein the bit is used to indicate the semi-persistent scheduling and semi-persistent scheduling parameters corresponding to the UE.

Further, performing any one operation of activating the semi-persistent scheduling, deactivating the semi-persistent scheduling, and modifying the semi-persistent scheduling parameters on multiple UEs by a pre-configured physical layer signaling, comprises:

there is at least one first bit field indicating common resource information of the multiple UEs in the pre-configured physical layer signaling, and at least one second bit field indicating predetermined resource information corresponding to each of the multiple UEs, wherein any of the UEs occupies at least X bits in the second bit field, the X bits indicating 2X or 2X−1 sets of semi-persistent scheduling parameters, and when the X bits indicates 2X−1 sets of semi-persistent scheduling parameters, a predetermined state value of the X bits represents the deactivation of semi-persistent scheduling.

Further, when the physical layer signaling includes: a predetermined bit field, or a predetermined value of a predetermined bit field in the physical layer signaling, the physical layer signaling is used to indicate at least one of: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling; or configuring different RNTIs for the physical layer signaling and another physical layer signaling; or configuring different PDCCH search spaces and/or control resource sets (CORESET) for the physical layer signaling and another physical layer signaling.

Further, performing the semi-persistent scheduling data transmission based on the configuration information of the semi-persistent scheduling parameters, comprises:

the configuration information including a time information having a time unit, determining a location for the data transmission according to the time information, and performing semi-persistent scheduling data transmission, wherein the time unit includes at least one of the following: second, millisecond, microsecond, femtosecond, nanosecond and picosecond.

Further, the configuration information including a time information having a time unit, determining a location for the data transmission according to the time information, and performing semi-persistent scheduling data transmission comprises any one of the following situations:

determining a data arrival time of the semi-persistent scheduling according to the configuration information, determining a data transmission symbol that is not earlier than the data arrival time and nearest to the data arrival time, and performing the semi-persistent scheduling data transmission by using the data transmission symbol as a starting point;

determining a data arrival time and a candidate transmission location of the semi-persistent scheduling according to the configuration information, determining a candidate transmission location that is not earlier than the data arrival time and nearest to the data arrival time, and performing the semi-persistent scheduling data transmission at the candidate transmission location that is not earlier than the data arrival time and nearest to the data arrival time;

determining the data arrival time, the candidate transmission location, and the candidate transmission resource of the semi-persistent scheduling according to the configuration information, determining a data transmission symbol that is not earlier than the data arrival time and nearest to the data arrival time, in the candidate transmission resource, and performing the semi-persistent scheduling data transmission starting from the data transmission symbol to an end symbol of a candidate transmission location where the data transmission symbol is located;

determining a time window and a data arrival time of the semi-persistent scheduling according to the configuration information, determining a time window in which semi-persistent scheduling data transmission is possible by using the data arrival time as a starting point, and when there is at least one candidate transmission location in the time window in which the semi-persistent scheduling data transmission is possible, performing semi-persistent scheduling data transmission at the earliest candidate transmission location; and determining a time window and a data arrival time of the semi-persistent scheduling according to the configuration information, determining a time window in which semi-persistent scheduling data transmission is possible by using the data arrival time as a starting point, and when there is at least one semi-persistent scheduling candidate transmission time domain resource in the time window in which the semi-persistent scheduling data transmission is possible, performing semi-persistent scheduling data transmission on the earliest semi-persistent scheduling candidate transmission time domain resource.

Hereafter, the semi-persistent scheduling method of the embodiment described above of the present application is comprehensively and detailedly introduced through the following specific embodiments:

Specifically, the transmission based on SPS/CG may be implemented in at least one of the following manners. Manner 1, the base station configures all semi-persistent scheduling parameters by using a high-level signaling; after receiving the configuration information of all semi-persistent scheduling parameters, the UE considers that the semi-persistent scheduling is activated, and performs the reception or transmission of SPS/CG on the corresponding time-frequency resource according to the configuration information; if the base station releases an SPS/CG transmission by using the high-level signaling, after receiving the configuration of release an SPS/CG, the UE stops to perform the reception or transmission of SPS/CG on the corresponding time-frequency resource. For the convenience of description, this type of SPS/CG transmission is referred to as a first type of SPS/CG transmission. Manner 2, the base station configures a part of the semi-persistent scheduling parameters by using the high-level signaling, and the base station activates the SPS/CG transmission through the physical layer control channel, such as Downlink Control Information (DCI), and indicates the remaining semi-persistent scheduling parameters; after receiving the configuration information of the part of semi-persistent scheduling parameters and activation DCI, the UE can perform the reception or transmission of SPS/CG on the corresponding time-frequency resource; if the base station deactivates an SPS/CG transmission through the DCI, after receiving the de-activation DCI, the UE stops to perform the reception or transmission of SPS/CG on the corresponding time-frequency resource. For the convenience of description, this type of SPS/CG transmission is referred to as a second type of SPS/CG transmission.

Embodiment 1

In the prior art, for the first type of SPS/CG transmission, if it is necessary to change part of the semi-persistent scheduling parameters, the base station needs to transmit a high-level signaling to re-assign all semi-persistent scheduling parameters. For example, for uplink CG PUSCH transmission, the high-level signaling rrc-Configured Uplink Grant information includes time domain resources, frequency domain resources, antenna port information, reference signal DMRS signals, MIMO-related information, modulation and coding information (MCS and TBS), and power control, and so on. Generally, the latency of reconfiguration by a high-level RRC signaling is large. If the first type of SPS/CG transmission requires to feedback hybrid automatic repeat request acknowledgement (HARQ-ACK), the high-level signaling also needs to configure parameters related to the HARQ-ACK feedback, such as HARQ-ACK feedback time information and PUCCH resource information.

symbol start and symbol length, time offset, etc.) and modulation and coding information.

Preferably, if the base station configures multiple sets of SPS/CG configurations for the UE and one DCI can simultaneously indicate semi-persistent scheduling parameters of multiple sets of SPS/CG configurations, the number/or index of SPS/CG configuration indicated in the DCI needs to be configured, and for each set of SPS/CG configuration, there are X bits respectively indicating one set of semi-persistent scheduling parameters of the 2X sets of semi-persistent scheduling parameters. Preferably, X is standard pre-defined or configurable, wherein X may be 0 or other positive integers. When X=0, the number of semi-persistent scheduling parameters is 1. Preferably, the maximum number of SPS/CG configuration that the DCI can indicate is standard predefined, or the maximum payload of the DCI is standard

```
rrc-ConfiguredUplinkGrant              SEQUENCE {
   timeDomainTime offset                  INTEGER (0..5119),
   timeDomainAssignment                   INTEGER (0..15),
   frequencyDomainAssignment              BIT STRING (SIZE(18)),
   antennaPort                            INTEGER (0..31),
   dmrs-SeqInitialization                 INTEGER (0..1)
OPTIONAL,   -- Need R
   precodingAndNumberOfLayers              INTEGER (0..63),
   srs-ResourceIndicator                   INTEGER (0..15)
OPTIONAL,   -- Need R
   mcsAndTBS                               INTEGER (0..31),
   frequencyHoppingTime offset             INTEGER (1..
   maxNrofPhysicalResourceBlocks-1)           OPTIONAL,   -- Need R
   pathlossReferenceIndex                  INTEGER (0..maxNrofPUSCH-
   PathlossReferenceRSs-1),
.}
```

In order to change the semi-persistent scheduling parameters more flexibly and control the physical layer control signaling overhead to a reasonable range, the transmission parameter reconfiguration can be performed by combining the high-level signaling configuration with the DCI dynamic indication. Specifically, the 2X sets of semi-persistent scheduling parameters can be configured by using the high-level signaling, and one set of semi-persistent scheduling parameters is indicated by X bits in the DCI.

Preferably, the high-level signaling configures a set of parameters among the 2X sets of semi-persistent scheduling parameters to be used after activation for the first time, or the first set parameters in configured 2X sets of semi-persistent scheduling parameters is pre-defined to be used after activation for first time. Subsequently, the base station can change the semi-persistent scheduling parameters by DCI dynamically indicating a set of parameters in the 2X sets of semi-persistent scheduling parameters. For example, the base station configures a CG configuration and configures four sets of semi-persistent scheduling parameters for this CG configuration, wherein the first set of semi-persistent scheduling parameters is used for using for the first time after activation. After receiving the configuration information, the UE transmits the CG PUSCH according to the first set of semi-persistent scheduling parameters. Subsequently, the base station transmits a DCI indicating that the UE uses the second set of semi-persistent scheduling parameters among four sets of semi-persistent scheduling parameters. After receiving the DCI, the UE transmits the CG PUSCH according to the second set of semi-persistent scheduling parameters.

Preferably, the semi-persistent scheduling parameter includes at least one of frequency domain resource information, time domain resource information (e.g., period, predefined. For example, the base station configures four sets of SPS configurations with respective index of 0, 1, 2, and 3, and four sets of semi-persistent scheduling parameters are configured for each set of SPS configuration. The DCI has a total of 8 bits. For each SPS configuration, the values 0~3 of 2-bit correspond to the first to fourth sets of semi-persistent scheduling parameters of the four sets of semi-persistent scheduling parameters. If the SPS configuration are configured on a plurality of carriers, in order to distinguish the SPS configuration on each carrier, different SPS configuration indexes may be assigned, or may be distinguished by the carrier information and the SPS configuration index. It should be noted that the number of sets of semi-persistent scheduling parameters configured by the base station for each set of SPS configuration is the same or different. For example, the base station configures two sets of semi-persistent scheduling parameters for the first set of SPS configuration, configures four sets of semi-persistent scheduling parameters for the second set of SPS configuration, configures two sets of semi-persistent scheduling parameters for the third set of SPS configuration, and configures four sets of semi-persistent scheduling parameters for the fourth set of SPS configuration.

Preferably, if one DCI can simultaneously indicate the semi-persistent scheduling parameters of multiple sets of SPS/CG configurations, the UE transmits the HARQ-ACK feedback after receiving the DCI. In an implementation manner, this DCI indicates a PUCCH resource for transmitting a HARQ-ACK, such as a HARQ-ACK timing and a PUCCH time-frequency resource. In another implementation manner, the high-level signaling configures a PUCCH resource for transmitting the HARQ-ACK, or the high-level signaling configures a PUCCH resource of HARQ-ACK of each set of SPS/CG configuration, and the UE determines a PUCCH resource of the HARQ-ACK of the DCI according to the PUCCH resource of the HARQ-ACK of one set of SPS/CG configuration among multiple sets of SPS/CG configurations in the DCI. Preferably, the PUCCH resource of the HARQ-ACK of the DCI is determined according to the PUCCH resource of the HARQ-ACK in the configuration of the minimum SPS/CG configuration index and/or the minimum index of multiple sets of semi-persistent scheduling parameters of the SPS/CG configuration.

In the prior art, for the second type of SPS/CG transmission, if it is necessary to change part of the semi-persistent scheduling parameters, the base station may re-configure the semi-persistent scheduling parameters by re-transmitting the activation DCI, or the base station also needs to reconfigure the semi-persistent scheduling parameters by transmitting a high-level signaling. For example, the activation DCI can reconfigure time domain resources, frequency domain resources, antenna port information, reference signal DMRS signals, MIMO related information, modulation and coding information, and power control information, and so on. In order to save the physical layer control channel overhead and achieve a balance of flexibility and control channel reliability, the method described above may also be used to activate/deactivate the second type of SPS/CG transmission or change the semi-persistent scheduling parameters.

Preferably, if a DCI can activate multiple sets of SPS/CG configurations at the same time, the number and/or index of the SPS/CG configuration indicated in the DCI needs to be configured, and 2X sets of semi-persistent scheduling parameters are configured for each SPS/CG configuration, wherein X bits indicate one set of semi-persistent scheduling parameters of 2X sets of semi-persistent scheduling parameters. In the process of configuring 2X sets of semi-persistent scheduling parameters for each set of SPS/CG configuration, the number of sets of semi-persistent scheduling parameters configured for each set of SPS/CG configuration are the same or different.

Preferably, if a DCI can simultaneously activate/deactivate multiple sets of SPS/CG configurations, the number and/or index of SPS/CG configuration indicated in this DCI needs to be configured, and (2X−1) sets of semi-persistent scheduling parameters are configured for each set of SPS/CG configuration, which respectively correspond to the state value 1~(2X−1) of the X bits in the DCI, and the value "0" of the remaining state indicates that the SPS/CG configuration is deactivated. In the process of configuring (2X−1) sets of semi-persistent scheduling parameters for each set of SPS/CG configuration, the number of the sets of semi-persistent scheduling parameters configured for each SPS/CG configuration are the same or different.

Preferably, for a set of SPS/CG configuration, the DCI includes multiple bit fields corresponding to different types of semi-persistent scheduling parameters, and each bit field corresponds to one or more sets of semi-persistent scheduling parameters. The semi-persistent scheduling parameters are configured by the high-level signaling, and a set of semi-persistent scheduling parameters is dynamically indicated by corresponding bit fields in the DCI. For example, the DCI includes two bit fields, one of which is used to indicate frequency domain resources and has X1 bits, and the base station configures 2X1 frequency domain resource parameters; the other bit field is used to indicate time domain resources and has X2 bits, and the base station configures 2X2 frequency domain resource parameters.

Embodiment 2

In some scenarios, such as supporting different service types, the parameters of multiple sets of SPS/CG configurations are different. In other scenarios, the characteristics of multiple sets of SPS/CG configurations are similar or identical, then a set of signaling can be used to configure the same/common transmission parameters in these SPS/CG configurations. For example, to reduce latency, multiple sets of SPS/CG configurations can be configured for the same URLLC service type. For another example, in order to solve the problem that the time sensitive service (TSN) period is not an integer multiple of the SPS/CG configuration period, multiple sets of SPS/CG configuration can be configured for the same TSN service. The multiple sets of SPS/CG configurations have the same frequency domain resource, modulation and coding information, and period, but the start locations of the time domain are different, for example, there is a time offset between the PDSCHs or the PUSCHs of the multiple sets of SPS/CG configuration. The time offset may be of the order of magnitude of symbol (e.g., in units of OFDM symbols), or may be of the order of magnitude of a slot, a sub-slot, or may be absolute time, such as X microseconds (may not be integer multiple OFDM symbol time length).

In an implementation manner, when configuring the multiple sets of SPS/CG configuration, only one set of common parameters, such as frequency domain resources, modulation and coding information, and periods, may be configured, and corresponding time domain resources are respectively configured for each set of SPS/CG configuration, for example, the time offset with a slot as the granularity, and/or the symbol starting point and the time length (the number of symbols) occupied by the PDSCH/PUSCH in one slot.

In another implementation manner, when configuring the multiple sets of SPS/CG configurations, only one set of common parameters may be configured, and an time offset between sets of SPS/CG configurations may be additionally configured. The time characteristic parameters in the common parameters, such as the time offset with a slot as the granularity, the starting symbol and the time length of the PDSCH/PUSCH, are only applicable to the first set of SPS/CG configuration among the multiple sets of SPS/CG configurations. The time domain resources of the PDSCH/PUSCH of other SPS/CG configurations are determined by the time domain resources of the PDSCH/PUSCH of the first set of SPS/CG configuration or the previous set of SPS/CG configuration and the time offset between the sets of SPS/CG configurations.

In addition, the number and/or index of the multiple sets of SPS/CG configurations need to be configured.

As shown in FIG. 3, the base station configures four sets of CG configurations, and indicates a frequency domain resource, a time domain resource, a pilot information (DMRS), an MCS, and a TBS by using a set of signaling. The time domain resource information indicates that the period is 1 slot, and indicates the number of slots of the first set of CG configuration time offset from the system frame SFN=0, for example, 15 time slots time offset from SFN0, that is, located at the six slot in the SFN1, and the time domain resource information indicates that the first set of CG configuration occupies the third to sixth symbols in the slot, and the repetition times is K=1. The base station also configures a time offset between sets of CG configurations to be 2 symbols. Then, starting from time slot 15, the 3th to 6th symbols of each time slot are the resources of the first set of CG configuration (#1 CG in the figure), and the 5th to 8th symbols are the resources of the second set of CG configuration (#2 CG in the figure), the 7th to 10th symbols are the resources of the third set of CG configuration (#3 CG in the figure), and the 9th to 11th symbols are the resources of the fourth set of CG configuration (#4 CG in the figure).

Preferably, in one period, the transmitting end may attempt to transmit the PDSCH/PUSCH on the time domain resources of multiple sets of SPS/CG configurations The time domain resources of the multiple sets of SPS/CG configurations do not overlap each other. For example, the base station configures three sets of SPS PDSCH, the frequency domain resource, the period, the starting point and the symbol length in one downlink time unit, the pilot information (DMRS), the MCS, and the TBS are the same, and the time offsets of the three sets of SPS PDSCHs are configured as 0 slots, 16 slots, and 33 slots, respectively. If the base station activates the transmission of the three sets of SPS PDSCH configurations, the base station can respectively transmit the PDSCH on the resources of the three sets of SPS PDSCH configurations.

Preferably, in one period, the transmitting end may attempt to transmit the PDSCH/PUSCH on the time domain resources of multiple sets of SPS/CG configurations, but only transmit the PDSCH/PUSCH on the time domain resource of a set of SPS/CG configuration. When the transmitting end is a base station, the base station may attempt to transmit the PDSCH or receive the PUSCH on the time domain resources of multiple sets of SPS/CG configurations, but only transmit the PDSCH or receive the PUSCH on time domain resources of a set of SPS/CG configuration. When the transmitting end is the user equipment, the user equipment may attempt to transmit the PUSCH or receive the PDSCH on the time domain resources of multiple sets of SPS/CG configurations, but only transmit the PUSCH or receive the PDSCH on the time domain resource of a set of SPS/CG configuration.

Preferably, in one period, the HARQ process number is the same regardless of the PDSCH/PUSCH is transmitted on the time domain resources of which SPS/CG configuration. For example, the HARQ process number is calculated according to the earliest set of SPS/CG configuration.

Preferably, in one period, the HARQ process number is calculated according to the SPS/CG configuration occupied by the actually transmitted SPS/CG PDSCH/PUSCH.

Preferably, the base station configures that the transmitting end can transmit the PDSCH/PUSCH on time domain resources of multiple sets of SPS/CG configurations or a set of SPS/CG configuration in one period.

In another implementation manner, similar to the method described above, only one set of common parameters is configured, wherein the time characteristic parameters are only applicable to the first set of SPS/CG configuration in the multiple sets of SPS/CG configurations, the time domain resources of the PDSCH/PUSCH of other SPS/CG configurations are all determined by the time domain resources of the PDSCH/PUSCH of the first set or the previous set of SPS/CG configuration and the time offset between the sets of SPS/CG configurations; and the time offset between sets of SPS/CG configurations is additional configured; the number of sets of SPS/CG configuration is unnecessary to be configured, and the number of sets of SPS/CG configurations is determined by the number of SPS/CG PUSCHs that can be fully mapped in one period. As shown in FIG. 4, in one period, the number of CG PUSCHs that can be fully mapped at most is 6 at intervals of 2 symbols, the number of SPS/CG configuration is unnecessary to be configured by the base station, and the base station and the UE both assume available number of SPS/CG configuration is 6.

Preferably, in one period, the transmitting end may attempt to transmit the PDSCH/PUSCH on the time domain resources of multiple sets of SPS/CG configurations, but only transmit the PDSCH/PUSCH on the time domain resource of a set of SPS/CG configuration. When the transmitting end is a base station, the base station may attempt to transmit the PDSCH or receive the PUSCH on time domain resources of multiple sets of SPS/CG configurations, but only transmit the PDSCH or receive the PUSCH on time domain resources of a set of SPS/CG configuration. When the transmitting end is the user equipment, the user equipment may attempt to transmit the PUSCH or receive the PDSCH on the time domain resources of multiple sets of SPS/CG configuration, but only transmit the PUSCH or receive the PDSCH on the time domain resource of a set of SPS/CG configuration.

Preferably, in one period, the HARQ process number is the same regardless of the PDSCH/PUSCH is transmitted on the time domain resources of which SPS/CG configuration. For example, the HARQ process number is calculated according to the earliest set of SPS/CG configuration.

Preferably, in one period, the HARQ process number is calculated according to the SPS/CG configuration occupied by the actually transmitted SPS/CG PDSCH/PUSCH.

In another implementation manner, for a set of SPS/CG configuration, a set of common parameters are configured, wherein the time characteristic parameters are only applicable to the first SPS/CG PDSCH/PUSCH candidate transmission location in the set of SPS/CG configuration; and the time offset between SPS/CG PDSCH/PUSCH candidate transmission locations in the set of SPS/CG configuration is configured. That is to say, the time domain resources of each SPS/CG PDSCH/PUSCH candidate transmission location in the set of SPS/CG configuration are all determined by the time domain resources of the first or previous SPS/CG PDSCH/PUSCH candidate transmission location in the set of SPS/CG configuration and a time offset between the SPS/CG PDSCH/PUSCH candidate transmission locations.

Preferably, in one period, the transmitting end may attempt to transmit the PDSCH/PUSCH on multiple SPS/CG PDSCH/PUSCH candidate transmission locations, but may only transmit on one SPS/CG PDSCH/PUSCH candidate transmission location. When the transmitting end is a base station, the base station may attempt to transmit the PDSCH or receive the PUSCH on multiple SPS/CG PDSCH/PUSCH candidate transmission locations, but may only transmit the PDSCH or receive the PUSCH at one SPS/CG PDSCH/PUSCH candidate transmission location. When the transmitting end is a user equipment, the user equipment may attempt to transmit the PUSCH or receive the PDSCH on multiple SPS/CG PDSCH/PUSCH candidate transmission locations, but may only transmit PUSCH or receive the PDSCH on one SPS/CG PDSCH/PUSCH candidate transmission location.

Preferably, the number of SPS/CG PDSCH/PUSCH candidate transmission locations in one period can be configured by the high-level signaling or determined by the number of SPS/CG PUSCHs that can be fully mapped in one period. As shown in FIG. 5, assuming that the uplink traffic arrives at symbol #6, the UE can start transmitting the CG PUSCH at symbol #7 (the fourth CG PUSCH candidate transmission location in the same period). In the next period, the UE may start transmitting at the first CG PUSCH candidate transmission location.

Preferably, in one period, the HARQ process number is the same regardless of the PDSCH/PUSCH is transmitted on the time domain resources of which SPS/CG candidate transmission location. For example, the HARQ process number is calculated according to the earliest SPS/CG candidate transmission location.

Preferably, in one period, the HARQ process number is calculated according to the starting point of SPS/CG candidate transmission location occupied by the actually transmitted SPS/CG PDSCH/PUSCH.

It is not difficult to see that the above three implementations are configured according to multiple SPS/CG PDSCH/PUSCH configurations, and the last implementation is processed by regarding these SPS/CG PDSCH/PUSCH as one SPS/CG configuration.

The solution described above can also be configured and indicated by physical layer signaling. For example, a set of common parameters including at least a frequency domain resource and modulation and coding information is indicated in the DCI signaling, the set of common parameters is applicable to all PDSCHs/PUSCHs of a set of SPS/CG configuration, the DCI includes time domain resource indication information, which is applicable to the first SPS/CG candidate transmission location in the set of SPS/CG configuration, and the DCI includes the time offset between the SPS/CG configuration candidate transmission locations. The set of time offsets between the SPS/CG configuration candidate transmission locations may be standard predefined, or configured by a higher layer, and the DCI indicates one type of element in the set of time offsets between the SPS/CG configuration candidate transmission locations. Alternatively, the time offset between SPS/CG configuration candidate transmission locations and the time domain resource of the first SPS/CG candidate transmission location are jointly encoded, and the DCI indicates one of the combinations. The time offset between the SPS/CG configuration candidate transmission locations may be indicated individually or share the same time offset.

For example, a set of common parameters including at least frequency domain resources and modulation and coding information is indicated in the DCI signaling, the set of common parameters is applicable to all PDSCH/PUSCH of each set of SPS/CG configuration, the DCI includes time domain resource indication information, which is applicable to the first set of SPS/CG configuration of the sets of SPS/CG configuration, and the DCI includes the time offset between the sets of SPS/CG configurations. The set of time offsets between the sets of SPS/CG configurations may be standard predefined, or configured by a higher layer, and the DCI indicates one type of element in the set of time offsets between the sets of SPS/CG configurations. Alternatively, the time offset between the sets of SPS/CG configurations and the time domain resource of the first set of SPS/CG configuration are jointly encoded, and the DCI indicates one of the combinations. The time offset between the sets of SPS/CG configuration may be indicated individually or share the same time offset.

Preferably, the time offset between the sets of SPS/CG configurations is only configured by the high-level signaling. The time offset between the SPS/CG configurations may be independently configured, for example, the slot time offsets with respect to the reference time slot are configured respectively, or the time offset between the SPS/CG configurations are the same. The base station only configures a common time offset, for example, the downlink time slot in which the current SPS PDSCH configuration is located is determined based on this common time offset and the time domain resources of the previous SPS PDSCH configuration.

Preferably, the DCI also includes period information of the SPS/CG configuration. Preferably, the period information of the SPS/CG configuration is jointly encoded with the time offset between SPS/CG configuration candidate transmission locations, or the time offset between the SPS/CG configuration candidate transmission locations, the period information and the time domain resource of the first SPS/CG candidate transmission location are jointly encoded, and the DCI indicates one of the combinations. Preferably, the period information of the SPS/CG configuration is jointly encoded with the time offset between sets of SPS/CG configurations, or the time offset between sets of SPS/CG configurations, the period information, and the time domain resource of the first set of SPS/CG are jointly encoded, and the DCI indicates one of the combinations.

Preferably, the DCI further includes HARQ-ACK timing information. Only one HARQ-ACK timing information is included in the DCI, and each SPS PDSCH configuration shares the same HARQ-ACK timing. Alternatively, the DCI includes multiple HARQ-ACK timing information, and each SPS PDSCH configuration corresponds to one HARQ-ACK timing respectively.

Preferably, if multiple SPS PDSCH configuration are simultaneously deactivated through one DCI, the HARQ-ACK feedback of the deactivation DCI is determined according to the HARQ-ACK timing and PUCCH resources indicated in the deactivated DCI. In deactivation DCI, not only the indication of deactivating the SPS PDSCH configuration but also the HARQ-ACK timing and the PUCCH resource indication bit field are included.

Preferably, the above DCI is the SPS/CG configuration activation DCI, for example for activating the enhanced second type of SPS/CG transmission. Preferably, the existing bit field is reusable in the above activation DCI to indicate the time offset between the SPS/CG configuration candidate transmission locations and/or the period information of the SPS/CG configuration, for example, the existing bit field includes a bit field for indicating a redundancy version and/or a bit field for indicating a HARQ process number. Preferably, the above DCI is a specific DCI and has a different DCI format than the activation DCI.

Preferably, the existing bit field is reusable in the above activation DCI to indicate the time offset between the sets of SPS/CG configurations and/or the period information of the SPS/CG configuration, for example, the existing bit field includes a bit field for indicating a redundancy version, and/or a bit field for indicating a HARQ process number. Preferably, the above DCI is a specific DCI and has a different DCI format than the activation DCI.

Preferably, the base station can only activate or deactivate the multiple sets of SPS/CG configurations at the same time. As mentioned above, the number and/or index of multiple sets of SPS/CG configurations sharing parameters is configured by the base station. Preferably, an index of a predefined SPS/CG configuration in the multiple sets of SPS/CG configurations is indicated in the activation/deactivation DCI, for example, the set SPS/CG configuration with minimum SPS/CG configuration index value is indicated in the activation/deactivation DCI, so that the index values of another SPS/CG configuration can be determined. The advantage of this method is that the DCI design of simultaneously activating/deactivating multiple sets of SPS/CG configurations is basically the same as the DCI design of activating/deactivating one set of SPS/CG configuration, all indicating a set of transmission parameters and an index of a set of SPS/CG configuration in the DCI. The difference is that the index and transmission parameters of activated/deactivated multiple sets of SPS/CG configurations can be determined simultaneously by indicating the index and transmission parameters of the set of SPS/CG configuration.

Preferably, the base station can simultaneously activate or deactivate a part of SPS/CG configuration in multiple sets of SPS/CG configurations. For example, in activation/deactivation DCI, a bit field indicating which SPS/CG configuration is activated or deactivated of the multiple sets of SPS/CG configurations is included. This bit field can be in the form of a bitmap or indicates one of the combinations of multiple sets of SPS/CG configurations configured by the higher layer signaling.

Embodiment 3

The configuration signaling of the time domain resource described above, the starting symbol and the symbol length of the SPS/CG PDSCH/PUSCH may be reused as a starting symbol and the symbol length in the time domain resource assignment table (for example, PUSCH-Time Domain Resource Assignment) configured by the base station for the PDSCH/PUSCH configuration based on scheduling. The time offset between SPS/CG PDSCH/PUSCH and time offset of first/first set of SPS/CG PDSCH/PUSCH with respect to SFN 0 or with respect to the slot/sub-slot where the SPS/CG activation signaling is located are indicated separately, and the two types of time offsets may be indicated by independent domains or jointly encoded. In another implementation manner, the starting symbol and the symbol length of the SPS/CG PDSCH/PUSCH, and the time offset between the SPS/CG PDSCH/PUSCH are jointly encoded to form a new time domain resource assignment table, which is dedicated to the SPS/CG PDSCH/PUSCH. Or, the starting symbol and the symbol length of the SPS/CG PDSCH/PUSCH, the time offset between the SPS/CG PDSCH/PUSCH, and the time offset of the first/first set of SPS/CG PDSCH/PUSCH with respect to SFN 0 or with respect to the slot/sub-slot where the SPS/CG activation signaling is located are jointly encoded, to form a new time domain resource assignment table dedicated to SPS/CG PDSCH/PUSCH. In addition, the period information may be jointly encoded with the time domain resource information described above to form a new time domain resource assignment table. The DCI may indicate a row index of the time domain resource assignment table. Table 1 gives an illustration of the information elements for the time characteristic parameters configuration for the enhanced second type of CG PUSCH transmission. The information element "CG PUSCH time domain resource assignment" includes at least: a time offset between CG PUSCHs in a CG PUSCH configuration ("time offset between CG PUSCHs"), which ranges from 1 symbol, 2 symbols, 4 symbols and the 7 symbols respectively corresponding to the values 0~3; the time offset of the first activated CG PUSCH to the activation signaling is "the time offset k2 from the CG PUSCH to the activation signaling", which ranges 0~32 time slots; the symbol starting point and symbol length of the first activated CG PUSCH in a time slot ("starting symbol and length"), ranging from 0th symbol to 13th symbol and symbol length of 1~14 symbols.

TABLE 1

CG PUSCH time domain resource assignment information elements

...
CG PUSCH time domain resource assignment ::= SEQUENCE {
   Time offset between CG PUSCHs
   INTEGER(0..3)
   Time offset k2 from the CG PUSCH to the activation signaling
   INTEGER(0..32)
   ...
   starting symbol and length
   INTEGER (0..127)
}

Embodiment 4

In the prior art, an SPS/CG configuration may be deactivated by a specific DCI, for example, the deactivation of an SPS/CG configuration is indicated by the following: DCI format 0_0 or DCI format 1_0 scrambled by CS-RNTI or SPS-RNTI are used, and the HARQ process number, redundancy version, modulation coding, and frequency domain resource indication bit fields in the above DCI are set to specific values.

In order to save DCI overhead, multiple SPS/CG configurations can be activated simultaneously by one DCI. The base station can configure the deactivation DCI by the high-level signaling to deactivate only one SPS/CG configuration or deactivate multiple SPS/CG configurations. If one DCI to deactivate multiple SPS/CG configurations, the DCI includes a bit field for identifying multiple SPS/CG configurations. For example, the bit field indicates whether to deactivate each SPS/CG configuration in the form of a bit-map. For another example, the high-level signaling configures 2M SPS/CG configuration groups, and the M bits of the bit field correspond to 2M SPS/CG configuration groups. If the bit corresponding to the mth SPS/CG configuration set indicates the deactivation, wherein m=1, 2, . . . 2M, each SPS/CG configuration in the mth SPS/CG configuration group is simultaneously deactivated.

Preferably, the above bit field can reuse a specific bit field in the DCI to indicate the SPS/CG configuration to be deactivated. For example, the above DCI can be used as an uplink data scheduling or a downlink data scheduling DCI of a fallback mode, such as DCI format 1_0, and can also be used as a deactivation DCI. At least one of the time domain resource assignment bit field, frequency hopping flag bit field, transmission power control (TPC), virtual resource block to physical resource block mapping (VRB-to-PRB mapping) bit field, HARQ process number bit field, the redundancy version bit field, the modulation coding method bit field, and the frequency domain resource assignment bit field in the uplink data scheduling or the downlink data scheduling DCI of the fallback mode may be used to indicate the SPS/CG configuration to be deactivated. At least one bit field in the above bit fields that is not used to indicate to deactivate SPS/CG configuration can be used to validate the deactivation DCI. For example, in order to maintain error correction capability similar to that of deactivation DCI in prior art, the time domain resource assignment bit field and/or the virtual resource block to the physical resource block mapping bit field are used to indicate the SPS/CG configuration to be deactivated, the HARQ process number bit field, the redundancy version bit field, and the modulation coding method bit field and frequency domain resource assignment bit field are set to a predefined value for checking the deactivation DCI. For another example, the HARQ process number bit field is used to indicate the SPS/CG configuration to be deactivated, and in order to maintain error correction capability similar to that of deactivation DCI in prior art, the time domain resource assignment bit field and/or the virtual resource block to the physical resource block mapping bit field, the redundancy version bit field, and the modulation coding method bit field and frequency domain resource assignment bit field are set to a predefined value for checking the deactivation DCI.

Preferably, if the number of configured SPS/CG configuration groups to be deactivated exceeds the number of combinations that can be indicated by a bit field A, the bit field A and a bit field B are combined to indicate the SPS/CG configuration group to be deactivated, and the remaining bits in the bit field B can be used to check the deactivation DCI. The bit fields A and B are predefined by the standard. For example, it is assumed that M=4, the base station configures 2M=16 SPS/CG configuration groups, and each SPS/CG configuration group may include one or more SPS/CG configurations, four bits in the deactivation DCI are required to indicate to deactivate one of the sixteen SPS/CG configuration groups. If the number of bits N of the HARQ process number bit field is greater than or equal to M, the SPS/CG configuration groups are indicated by the HARQ process number bit field, and the remaining N-M bits of the HARQ process number bit field can be set to a predefined value for checking the deactivation DCI. If the number of bits N of the HARQ process number bit field is less than M, the first M-N bits of the time domain resource assignment bit field is also used to indicate the SPS/CG configuration group to be deactivated, and the remaining bits of the time domain resource assignment bit field can be set to a predefined value for checking the deactivation DCI. For another example, if the number of bits N of the time domain resource assignment bit field is greater than or equal to M, the SPS/CG configuration groups are indicated by the time domain resource assignment bit field. If N is less than M, the first M-N bits of the transmit power control bit field are also used to indicate the SPS/CG configuration group to be deactivated. Preferably, if the total number of bits of the bit field A and the bit field B is still less than M, a bit field C can be combined with the bit field A and the bit field B to indicate the SPS/CG configuration group to be deactivated. The bit fields A, B and C are predefined by the standard. Preferably, if the number of configured SPS/CG configuration groups to be activated exceeds the number of combinations that can be indicated by the bit field A, the bit field A and the bit field B are combined to indicate the SPS/CG configuration group to be activated, and the remaining bits in the bit field B can be used to check the activation DCI. The bit fields A and B are predefined by the standard.

Preferably, if one DCI activates at most one SPS/CG configuration, and the number of configured SPS/CG configurations exceeds the number of combinations that can be indicated by a bit field A, the bit field A and a bit field B are combined to indicate the index of SPS/CG configuration to be activated, and the remaining bits in bit field B can be used to check the activation DCI. The bit fields A and B are predefined by the standard.

Preferably, if one DCI deactivates at most one SPS/CG configuration, and the number of configured SPS/CG configurations exceeds the number of combinations that can be indicated by a bit field A, the bit field A and a bit field B are combined to indicate the index of SPS/CG configuration to be deactivated, and the remaining bits in bit field B can be used to check the deactivation DCI. The bit fields A and B are predefined by the standard.

Preferably, the bit fields in the activation and deactivation DCI for indicating the SPS/CG configuration or the SPS/CG configuration group may be different.

Preferably, if the UE is configured with a semi-persistent HARQ-ACK codebook (also referred to as a Type-1 HARQ-ACK codebook), the HARQ-ACK timing bit field may also be used to indicate the SPS/CG configuration to be deactivated. For example, in an implementation, because the HARQ-ACK of the deactivation DCI occupies the HARQ-ACK location corresponding to the SPS/CG PDSCH to be deactivated, and the HARQ-ACK location corresponding to the SPS/CG PDSCH is determined by the activation DCI, and does not need to depend on the HARQ-ACK timing in the deactivation DCI. Therefore, the HARQ-ACK timing bit field can be used to indicate the SPS/CG configuration to be deactivated.

Embodiment 5

The above described method of activating/deactivating or modifying semi-persistent scheduling parameters can also be adaptable to an operation of simultaneously activating/deactivating or modifying transmission parameters for multiple UEs by one DCI. Specifically, a same RNTI and a DCI for performing activation/deactivation or modification of semi-persistent scheduling parameters are assigned for a group of UEs; the bit locations of each UE in the DCI are configured; and the SPS/CG configuration and semi-persistent scheduling transmission parameters corresponding to each UE are configured.

Preferably, in the DCI, there is at least one bit field used to indicate common resource information of the multiple UEs, and there is at least one bit field used to indicate specific resource information corresponding to each of the multiple UEs. For example, the common resource information is modulation and coding information, and the specific resource information indicated individually is the time-frequency resource information.

Preferably, in the DCI, the bit field of each UE includes at least X bits for indicating 2X group transmission parameters, or respectively indicating (2X−1) group transmission parameters and a specific value of X bits (for example, 0) is reserved for deactivating the SPS/CG configuration. Preferably, in the DCI, the bit field of each UE includes at least M*X bits, wherein M corresponds to M sets of SPS/CG configuration.

Embodiment 6

The method of activating/deactivating or modifying semi-persistent scheduling parameters described above may introduce a new DCI format or reuse an existing DCI format. If the new DCI format has the same payload as the existing DCI format, for example, the DCI used to reconfigure semi-persistent scheduling parameters has the same payload as the activation DCI, or the same DCI format has different uses, for example, the same DCI format can be used as an activation/deactivation or semi-persistent scheduling parameter reconfiguration for one SPS/CG configuration, or as an activation/deactivation or semi-persistent scheduling parameter reconfiguration for multiple SPS/CG configuration, therefore a method for distinguishing between different DCI formats or different uses of the same DCI format is required.

Preferably, the DCI formats or uses can be distinguished by a specific bit field in the DCI, for example, a bit field dedicated to distinguishing DCI formats or uses; or the DCI formats or uses can be distinguished by a specific value of a specific bit field in the DCI, for example, by setting the HARQ process number and the redundancy version indication bit field in the DCI to all 0s to indicate operation on one SPS/CG, and by setting the HARQ process number and the redundancy version indication bit field in the DCI to all 1 s to indicate operation on multiple SPS/CGs; or the DCI formats or uses can be distinguished by different RNTIs.

Preferably, for the same DCI format with different uses, the PDCCH search space and/or the control resource set CORESET are respectively configured to distinguish the DCI formats or uses.

Embodiment 7

If one DCI can only deactivate one CG PUSCH, the deactivation DCI is no need to feed back HARQ-ACK. Generally, the base station continues to transmit the CG PUSCH to prevent the UE from un-detecting of the deactivation DCI, and the base station does not schedule other uplink transmissions on the CG PUSCH resource immediately after the deactivation DCI, and the base station can determine whether the UE continues to transmit CG PUSCH by detecting the signal on the CG PUSCH resource. However, when one DCI can deactivate multiple CG PUSCHs, if the HARQ-ACK is not fed back, the base station continues to transmit the CG PUSCH to prevent the UE from un-detecting of the deactivation DCI and the base station needs not to schedule other uplink signals on all CG PUSCHs that are deactivated, which cause a significant drop in system transmission efficiency. To improve this problem, the present invention proposes that when one DCI can deactivate multiple CG PUSCHs, the UE needs to feed back HARQ-ACK for this DCI. Or, when configuring the CG PUSCH group to be deactivated, the base station also configures whether the deactivation DCI of the CG PUSCH group needs to feed back the HARQ-ACK. Or, the base station configures whether the UE needs to feed back the HARQ-ACK for the deactivation DCI.

Preferably, the base station configures, for the UE, a PUCCH resource for feeding back a HARQ-ACK of the DCI for deactivating CG PUSCH. For example, the base station configures a PUCCH resource for feeding back the HARQ-ACK of the deactivation DCI for the UE. For another example, the base station configures one PUCCH resource for feeding back the HARQ-ACK of the deactivation DCI, for each CG PUSCH group of the UE.

Preferably, the base station configures, for the UE, a timing K1 for feeding back the HARQ-ACK of the DCI for deactivating CG PUSCH.

Preferably, if the base station configures the UE to feed back the HARQ-ACK of the DCI for deactivating CG PUSCH, the deactivation DCI includes the HARQ-ACK timing K1 information, and/or the PUCCH resource information. Preferably, at least one bit field of the time domain resource assignment bit field, frequency hopping flag bit field, transmission power control, HARQ process number bit field, the redundancy version bit field, the modulation coding method bit field, and the frequency domain resource assignment bit field in the DCI may be used to indicate the timing K1 or PUCCH resource information. For example, in the deactivation DCI, the HARQ process number bit field is used to indicate the information for deactivating CG PUSCH group, and the redundancy version bit field, the modulation coding method bit field, and the frequency domain resource allocation bit field are used to check the deactivation DCI, and time domain resource assignment bit field is used to indicate timing K1 and/or PUCCH resource. For another example, in the deactivation DCI, the HARQ process number bit field is used to indicate information for deactivating CG PUSCH group, and the redundancy version bit field, the modulation coding method bit field, and the frequency domain resource assignment bit field are used to check the deactivation DCI, and the frequency hopping flag bit field and/or the transmission power control bit field are used to indicate timing K1 and/or PUCCH resource.

Preferably, the power control bit field in the deactivation DCI is used for power control of the PUCCH.

When the UE only feeds back the HARQ-ACK of the deactivation DCI for deactivating the CG PUSCH (not fed back together with the HARQ-ACK of the other PDSCH or PDCCH), the UE determines the PUCCH resource according to the semi-static configuration of the base station or DCI indication. When the HARQ-ACK is fed back together with other HARQ-ACKs, the PUCCH resources are jointly determined according to the PUCCH resources indicated by the deactivation DCI and the PUCCH resources of other HARQ-ACKs. For example, the PUCCH resources for feeding back the HARQ-ACK of the deactivation DCI and other PDSCHs are determined according to the PUCCH resource for feeding back the HARQ-ACK, which is indicated by the last DCI, in the same PUCCH.

When the HARQ-ACK of the deactivation DCI for deactivating the CG PUSCH is fed back together with other HARQ-ACKs, it is required to determine that the bit position of the HARQ-ACK of the deactivation DCI in the HARQ-ACK codebook. Preferably, if the base station configures the semi-static HARQ-ACK codebook for the UE, the time domain resource indicated by the time domain resource allocation bit field in the deactivation DCI belongs to the PDSCH time resource set that can be indicated by the TDRA of the PDSCH. For example, the TDRA1 corresponding to the time domain resource allocation bit in the DCI for deactivating CG PUSCH is the TDRA of the downlink PDSCH. The bit position of the HARQ-ACK of this DCI is determined according to the time position of the PDSCH indicated by TDRA1. For another example, the base station configures a PDSCH time resource for the DCI for deactivating CG PUSCH, and the bit position of the HARQ-ACK of the deactivation DCI is determined according to the configured PDSCH time resource. The UE determines, according to the indicated time resource position, a bit position of the HARQ-ACK of the deactivation DCI in the semi-static codebook. Preferably, if the base station configures the dynamic HARQ-ACK codebook for the UE, the deactivation DCI includes downlink assignment index (DL DAI) information. The UE determines the bit position of the HARQ-ACK of the deactivation DCI in the dynamic codebook, according to the DL DAI. For example, the frequency hopping flag bit field in the DCI for deactivating CG PUSCH can be redefined as the DL DAI.

Embodiment 8

In order to improve the reliability of response for the activation/deactivation DCI, the activation/deactivation DCI may be confirmed by the control information MAC CE of the medium access control layer. For the convenience of description, this MAC CE is called a CG acknowledgment MAC CE.

In order to distinguish from MAC CEs of other functions, the function of this MAC CE is determined by the value of the logical channel ID (LCID) in the MAC subheader. For example, when the LCID value is 55, it is indicated that this MAC CE is a CG acknowledgment MAC CE.

An indication of the CG PUSCH configuration ID is included in a CG acknowledgment MAC CE or MAC subheader. Preferably, the indication of N bits is in one-to-one correspondence with the N CG PUSCH configuration IDs in the form of a bitmap. For example, a bitmap of eight bits is in one-to-one correspondence with eight configuration IDs. Alternatively, a bitmap of sixteen bits is used to correspond to sixteen configuration IDs one to one. Preferably, the number of bits of the CG PUSCH configuration ID indication is determined according to the total number of configured CG PUSCH configurations. For example, if the total number of configured CG PUSCH configurations is less than or equal to 8, then 8 bits are used to indicate; if the total number of configured CG PUSCH configurations is more than 8 and less than 16, then 16 bits are used to indicate. If the total number of configured CG PUSCH configurations is less than the number of bits, the unused bits are used as reserved bits. Preferably, the indication of N bits is in one-to-one correspondence with the N CG PUSCH configuration ID groups in the form of a bitmap. For example, the base station configures the CG PUSCH configuration ID group to be deactivated, and the CG PUSCH configuration ID group indicated in the CG acknowledgement MAC CE for activation/deactivation is in one-to-one correspondence with the CG PUSCH configuration ID group to be deactivated configured by the base station. In a specific implementation, the base station may activate one CG PUSCH configuration each time through one DCI, but the CG acknowledgement MAC CE indication for the activation DCI includes the CG PUSCH configuration ID group of the CG PUSCH configuration ID. In order to prevent the UE from un-detecting of the activation DCI of one CG PUSCH configuration in the group which the base station cannot discover, the base station can be configured to simultaneously transmit multiple DCIs and each DCI activates each CG PUSCH configuration in the group. Preferably, the indication of log 2(N) bits is in one-to-one correspondence with the N CG PUSCH configuration IDs or ID groups. Then, a CG acknowledgement MAC CE can only acknowledge the activation/deactivation of a CG PUSCH configuration ID or a CG PUSCH configuration ID group.

Preferably, the indication of the serving cell ID is included in a CG acknowledgment MAC CE or MAC subheader. In some scenarios, it is supported that the CG acknowledgement MAC CE is transmitted on one serving cell CCi to acknowledge activation/deactivation of the CG PUSCH on the serving cell CCj. By the serving cell ID indicated in the CG acknowledgement MAC CE, it can be determined that the CG acknowledgement MAC CE is an acknowledgment for activation/deactivation of the CG PUSCH on which serving cell.

Preferably, the indication of the BWP ID is included in a CG acknowledgment MAC CE or MAC subheader. In some scenarios, it is supported that the CG acknowledgement MAC CE is transmitted on one BWPi to acknowledge activation/deactivation of the CG PUSCH on the serving cell BWPj. By the BWP ID indicated in the CG acknowledgement MAC CE, it can be determined that the CG acknowledgement MAC CE is an acknowledgment for activation/ deactivation of the CG PUSCH on which BWP.

Preferably, when a CG acknowledgement MAC CE includes information of multiple CG PUSCH configurations, all information related to one CG PUSCH configuration is first arranged, and then all information related to the next CG PUSCH configuration is arranged. Alternatively, a type of information of each CG PUSCH configuration is arranged first, and then another type of information of each CG PUSCH configuration is arranged.

Preferably, when a CG acknowledgement MAC CE includes information of multiple CG PUSCH configurations, multiple CG PUSCH configurations belong to the same serving cell, and/or the same BWP. For example, if one CG acknowledgement MAC CE includes 24 bits, the first 8 bits thereof indicate the cell ID and the BWP ID, and the last 16 bits thereof indicate one or more CG PUSCH configuration IDs.

Preferably, the MAC CE includes an activation/deactivation indication, or the MAC sub-header includes an activation/deactivation indication. For example, the values of R bits in the MAC sub-header as 1 indicates an activation, and as 0 indicates a deactivation.

Preferably, the CG acknowledgement MAC CE is empty, or the CG acknowledgement MAC CE includes at least 8 bits, which is indicated by the MAC subheader. For example, in the MAC subheader, R of 2 bits and LCID of 6 bits are included, wherein at least 1 bit of the R of 2 bits can be used to indicate whether the CG acknowledgement MAC CE is empty. For another example, in the MAC subheader, an R of 1 bit, an F of 1 bit and an LCID of 6 bits are included, wherein the F of 1 bit indicates whether the CG acknowledgement MAC CE is empty.

The CG acknowledgement MAC CE is carried on the PUSCH. Generally, when the MAC entity has an uplink resource for a new transmission, the CG acknowledgment MAC CE can be transmitted on this uplink resource. If the CG acknowledgement MAC CE for the activation DCI is transmitted through the activated CG PUSCH resource, it may be determined from the CG PUSCH resource that the CG acknowledgement MAC CE is an acknowledgement for the DCI for activating this CG PUSCH. In this way, when no CG PUSCH configuration information in the CG acknowledgement MAC CE, the base station can also determine the CG PUSCH configuration ID corresponding to the received CG acknowledgment MAC CE. Similarly, the base station can also determine the cell ID and BWP ID where the CG PUSCH corresponding to the received CG acknowledgement MAC CE is located. If the resources of the activated at least two CG PUSCHs overlap, the CG acknowledgement MAC CE for the DCI for activating the second CG PUSCH is postponed to be transmitted on the next resource of this CG PUSCH.

Embodiment 9

Supporting Time-Sensitive Communications (TSC) is an important scenario for NR-based industry IoT. The TSC service usually arrives at a fixed period, but the period may not be the period of CG/SPS transmission which is supportable by the existing 5G system. For example, the SPS/CG period supported by the 5G system is in units of symbol length, or in units of time slots, for example, a period of 1 ms, and the time interval between adjacent SPS/CG PDSCH/PUSCH is an integer multiple of 1 ms. However, the period of the TSC service may be 0.8 ms and cannot be aligned with the SPS/CG period. For another example, the period of the TSC service is 1.1 ms, and the interval between two adjacent TSC service packets cannot even be aligned with the boundary of one OFDM symbol (the time length of one OFDM symbol including the CP (Cyclic prefix) is about 71.4 microseconds).

In order to enable the TSC service to be transmitted as timely as possible through the SPS/CG PDSCH/PUSCH, the transmission of the SPS/CG PDSCH/PUSCH may be determined by at least one of the following methods:

(1) According to the configured data arrival time, the latest data transmission symbol not earlier than the data arrival time is determined, and the SPS/CG PDSCH/PUSCH is transmitted starting from the data transmission symbol.

Specifically, the configured data arrival time can be implemented by a configuration period and a relative time offset. For example, the configuration period is in units of second, or millisecond, or microsecond, and other common time units. And the time offset with respect to the starting point of SFN0, or the end location of the slot/sub slot in which the activation DCI is, or the end location of the last symbol of the activation DCI. The time offset is in units of second, or millisecond, or microsecond, and other common time units, or the time offset is in units of symbol or time slot. Alternatively, the configured data arrival time can be implemented by configured the absolute time when the first data service arrives and a configuration period.

The configured data arrival time corresponds to the frame structure time, for example, a certain data arrival time is located in the X3th symbol of the time slot X2 in the SFN X1. Then, the SPS/CG PDSCH/PUSCH is transmitted from the X4th symbol for carrying the data, wherein the symbol length of the SPS/CG PDSCH/PUSCH is configured by the base station.

It is not difficult to see that there may be a case where the time difference between adjacent SPS/CG PDSCH/PUSCH is different. For example, the configured time offset is 2.8 ms after SFN0, and the period is 10.2 ms, and the time length of the SPS PDSCH is 2 symbols. As shown in FIG. 7, the starting symbol for transmitting the first SPS/CG PDSCH/PUSCH is determined to be the symbol #12 (rounded up ((mod (2.8 ms, one slot length)/one OFDM symbol length)) of the slot #2 (rounded down (mod (2.8 ms, one system frame length)/one slot length 1 ms)) of the SFN #0 (rounded down (2.8 ms/one system frame length 10 ms)) according to the time offset, wherein mod represents a modulo operation. The starting symbol for transmitting of the second SPS/CG PDSCH/PUSCH is the symbol #0 (rounded up ((mod (13 ms, one slot length)/one OFDM symbol length)) of the slot #3 (rounded down (mod (13 ms, one system frame length)/one slot length 1 ms)) of the SFN #1 (rounded down ((2.8+10.2) ms/one system frame length 10 ms)). The starting symbol for transmitting of the third SPS/CG PDSCH/PUSCH is the symbol #3 (rounded up ((mod (23.2 ms, one slot length)/one OFDM symbol length)) of the slot #3 (rounded down (mod (23.2 ms, one system frame length)/one slot length 1 ms)) of the SFN #2 (rounded down ((2.8+10.2+10.2) ms/one system frame length 10 ms)).

(2) A candidate transmission location, which is not earlier than the data arrival time and nearest to the data arrival time, in the SPS/CG PDSCH/PUSCH candidate transmission location is determined according to the configured data arrival time, the configured SPS/CG transmission period T2 and the time offset, and the SPS/CG PDSCH/PUSCH is transmitted in the candidate transmission location.

Specifically, the SPS/CG PDSCH/PUSCH candidate transmission location is determined according to the transmission period T2 and the time offset. Preferably, if the data arrival time is after the starting point of one SPS/CG PDSCH/PUSCH candidate transmission location, then it is sent at the next nearest candidate transmission location.

For example, the configured data arrival time is 2.8 ms after the slot #1 in which the activation DCI is, and the period is 15.2 ms. The configured SPS PDSCH period is 10 slots (10 ms), and the SPS PDSCH time domain resource is 4 slots after slot #1 where the activation DCI is located, that is, slot #5, the starting point is symbol #0 in the slot #5, and the time length of the PDSCH is 6 symbols. As shown in FIG. 8, the first data arrives in slot #4 of SFN i, and therefore it is transmitted on the SPS PDSCH of slot #5, and the second data arrives in slot #9 of SFN i+1, which is later than the SPS PDSCH candidate transmission location in slot #5 of SFN I, therefore it is transmitted on the next SPS PDSCH candidate transmission location, that is, the SPS PDSCH in the slot #5 of SFN i+2.

(3) A data transmission symbol that is not earlier than the data arrival time and nearest to the data arrival time in the SPS/CG PDSCH/PUSCH candidate transmission resources is determined according to the configured data arrival time, the configured SPS/CG transmission period T2 and the time offset, and the SPS/CG PDSCH/PUSCH is transmitted on symbols starting from the data transmission symbol to the end symbol of the candidate transmission location where the data transmission symbol is located.

Specifically, the SPS/CG PDSCH/PUSCH candidate transmission location is determined according to the transmission period T2 and the time offset, and the SPS/CG PDSCH/PUSCH candidate transmission resource is determined according to the time length that the PDSCH/PUSCH can be occupied. For example, the period T2 is 1 slot, the time offset is 0, the time length of each PDSCH/PUSCH is 2 symbols, and K=2, then the PDSCH/PUSCH candidate transmission resource in one period (1 slot) is symbols 0~3. Preferably, if the data arrival time falls within the candidate transmission resource, the SPS/CG PDSCH/PUSCH may be sent symbols starting from the symbol that is no earlier than the data arrival time point and nearest to the data arrival time point in the candidate transmission resource to the end symbol of the candidate transmission location where the symbol is located. For example, the candidate transmission location of the configured SPS PDSCH is symbol #0~symbol #5 in slot #5, and these six symbols are candidate transmission resources of the SPS PDSCH. As shown in FIG. 9, if the data arrival time is within the symbol #1, the SPS PDSCH is transmitted on the symbol #2 to symbol #5. Since the time domain resources of the actually transmitted SPS PDSCH is shorter than those of the configured SPS PDSCH, the transmitting end needs to generate SPS according to the configured Modulation and Coding Scheme (MCS) and Transmission-Block Size (TB S), then a puncturing operation or a rate matching operation is performed according to the resources of the actually transmitted SPS PDSCH.

Preferably, if the data arrival time point falls outside the candidate transmission resource, the SPS/CG PDSCH/PUSCH is transmitted in the next nearest candidate transmission resource.

(4) The PDSCH/PUSCH resource for transmitting the service is determined according to the configured data arrival time, the configured SPS/CG transmission period T2 and the time offset, and the time window. Specifically, based on the configured data arrival time and the configured time window length, starting from the data arrival time, a time window in which the PDSCH/PUSCH can be sent is determined. If there is at least one SPS/CG PDSCH/PUSCH candidate transmission location determined according to the transmission period T2 and the time offset within this time window, then earliest one of the candidate transmission locations is selected to transmit the SPS/CG PDSCH/PUSCH. If there is no SPS/CG PDSCH/PUSCH candidate transmission location within this time window, the SPS/CG PDSCH/PUSCH is transmitted starting from the data transmission symbol that is the nearest data transmission symbol not earlier than the data arrival time.

(5) The PDSCH/PUSCH resource for transmitting the service is determined according to the configured data arrival time, the configured SPS/CG transmission period T2 and the time offset, and the time window. Specifically, based on the configured data arrival time and the configured time window length, starting from the data arrival time, a time window in which the PDSCH/PUSCH can be sent is determined. If there is at least one SPS/CG PDSCH/PUSCH candidate transmission resource determined according to the transmission period T2 and the time offset within this time window, then earliest one of the candidate transmission resources is selected to transmit the SPS/CG PDSCH/PUSCH. If there is no SPS/CG PDSCH/PUSCH candidate transmission position within this time window, the SPS/CG PDSCH/PUSCH is transmitted starting from the data transmission symbol that is the nearest data transmission symbol not earlier than the data arrival time.

It should be noted that the contents in the above-mentioned Embodiments 1 to 9 is described by using a base station as an execution subject. In practical applications, the contents in the above-mentioned Embodiments 1 to 9 are also applicable to a user equipment, that is, the contents in the above-mentioned Embodiments 1 to 9 can be converted into descriptions in which the user equipment is the execution subject.

A semi-persistent scheduling method is provided in another embodiment of the present application, as shown in FIG. 6, and in this embodiment, the contents in the above embodiments are described by using a user equipment as an execution subject. The method includes: step S610, receiving configuration information of semi-persistent scheduling parameters transmitted by a base station; and step S620, performing semi-persistent scheduling data transmission based on the configuration information.

In the semi-persistent scheduling method provided by the embodiment of the present application, by receiving a configuration information of semi-persistent scheduling parameters transmitted by the base station and performing the semi-persistent scheduling data transmission based on the configuration information, the low-latency requirements of the URLLC is satisfied, so that existing semi-persistent scheduling transmission mechanism can support higher low-latency requirements, and introduce multiple semi-persistent scheduling configurations at the same time and assign different time-frequency resources for each semi-persistent scheduling configuration, thus finally multiple types of services can be simultaneously supported.

Specifically, receiving a configuration information of semi-persistent scheduling parameters transmitted by a base station, comprises:

receiving a high-level signaling transmitted by the base station, wherein the high-level signaling includes at least one set of semi-persistent scheduling and semi-persistent scheduling parameters corresponding to each set of semi-persistent scheduling; and receiving a physical layer signaling transmitted by the base station, wherein the physical layer signaling is used to indicate at least one of the following: at least one set of semi-persistent scheduling and at least one set of semi-persistent scheduling parameters of multiple sets of semi-persistent scheduling parameters of each set of semi-persistent scheduling, activation and/or deactivation of multiple sets of semi-persistent scheduling.

Further, performing the semi-persistent scheduling data transmission based on the configuration information comprises: determining at least one of the following: the number of semi-persistent scheduling, an index of semi-persistent scheduling, the number of semi-persistent scheduling parameters corresponding to each set of semi-persistent scheduling, an index of activated semi-persistent scheduling, and activated semi-persistent scheduling parameters, according to the high-level signaling.

Further, performing semi-persistent scheduling data transmission based on the configuration information comprises:

determining to activate multiple sets of semi-persistent scheduling and semi-persistent scheduling parameters of each set of semi-persistent scheduling according to the physical layer singling, and performing the semi-persistent data transmission according to the semi-persistent scheduling parameters, wherein the number of semi-persistent scheduling parameters corresponding to each set of semi-persistent scheduling is 2X, wherein X is used to indicate the number of bits of semi-persistent scheduling parameters of the set of semi-persistent scheduling in the physical layer signaling; or, determining to activate or deactivate multiple sets of semi-persistent scheduling according to the physical layer signaling and performing the semi-persistent data transmission according to the semi-persistent scheduling parameters, wherein the number of semi-persistent scheduling parameters corresponding to each set of semi-persistent scheduling is 2X−1, wherein X is used to indicate the number of bits of semi-persistent scheduling parameters of the set of semi-persistent scheduling in the physical layer signaling, and a predetermined value of the X bits represents to deactivate the set of semi-persistent scheduling, and the remaining values of the X bits represent to activate one set of the semi-persistent scheduling parameters of the set of semi-persistent scheduling.

Further, the configuration information of the semi-persistent parameters comprises any of the followings:

multiple sets of semi-persistent scheduling, common parameters of the multiple sets of semi-persistent scheduling, and time domain resources corresponding to each set of semi-persistent scheduling;

multiple sets of semi-persistent scheduling, common parameters of the multiple sets of semi-persistent scheduling, a time offset between sets of semi-persistent scheduling, and number and/or index of the multiple sets of semi-persistent scheduling, time characteristic parameter in the common parameters applied to a first set of semi-persistent scheduling among the multiple sets of semi-persistent scheduling;

multiple sets of semi-persistent scheduling, common parameters of the multiple sets of semi-persistent scheduling, and a time offset between sets of semi-persistent scheduling, time characteristic parameter in the common parameters applied to a first set of semi-persistent scheduling among the multiple sets of semi-persistent scheduling;

a set of semi-persistent scheduling, common parameters of the set of semi-persistent scheduling, and a time offset between candidate transmission locations of the set of semi-persistent scheduling, time characteristic parameter in the common parameters applied to a first candidate transmission location of the set of semi-persistent scheduling.

Further, the method further comprises any of the followings:

receiving joint encoding of the time domain resource indication information and the time offset between candidate transmission locations, wherein the physical layer signaling includes a time domain resource indication information applied to the first candidate transmission location of the set of semi-persistent scheduling, and a time offset between candidate transmission locations;

receiving joint encoding of the time domain resource indication information and the time offset between sets of semi-persistent scheduling, wherein the physical layer signaling includes a time domain resource indication information applied to the first set of semi-persistent scheduling among the multiple sets of semi-persistent scheduling, and a time offset between sets of semi-persistent scheduling;

receiving joint encoding of the transmission period and the time offset between candidate transmission locations, or receiving joint encoding of the transmission period, the time offset between candidate transmission locations and the time domain resource of the first candidate transmission location, wherein the physical layer signaling includes time domain resource indication information applied to the first candidate transmission location of the set of semi-persistent scheduling, a time offset between candidate transmission locations and a semi-persistent scheduling transmission period; and receiving joint encoding of the transmission period and the time offset between sets of semi-persistent scheduling, or receiving joint encoding of the transmission period, the time offset between sets of semi-persistent scheduling and the time domain resource of the first set of semi-persistent scheduling, wherein the physical layer signaling includes a time domain resource indication information applied to the first set of semi-persistent scheduling among the multiple sets of semi-persistent scheduling, a time offset between sets of semi-persistent scheduling and a semi-persistent scheduling transmission period.

Further, the method further comprises:

determining the time offset between the sets of semi-persistent scheduling and/or the transmission period of the semi-persistent scheduling, or determining the time offset between the candidate transmission locations and/or the transmission period of semi-persistent scheduling, according to at least one of the following bit fields in the physical layer signaling:

a bit field indicating a redundancy version;

a bit field indicating an HARQ process number; and an independent bit field.

Further, performing the semi-persistent scheduling data transmission based on the configuration information comprises:

in a semi-persistent scheduling transmission period, attempting to perform the semi-persistent scheduling data transmission on resources of at least one set of semi-persistent scheduling, and determining to perform the semi-persistent scheduling data transmission on resources of one set of semi-persistent scheduling; or in a semi-persistent scheduling transmission period, attempting to perform the semi-persistent scheduling data transmission on at least one candidate transmission location of one set of semi-persistent scheduling, and determining to perform the semi-persistent scheduling data transmission on one candidate transmission location.

Further, the method further comprises any of the followings:

when performing the semi-persistent scheduling data transmission on resources of a set of semi-persistent scheduling in a semi-persistent scheduling transmission period, calculating a HARQ process number according to the resources of earliest set of semi-persistent scheduling in the semi-persistent scheduling transmission period, or calculating a HARQ process number according to the resources of semi-persistent scheduling occupied by the semi-persistent scheduling data actually transmitted in the semi-persistent scheduling transmission period; and when performing the semi-persistent scheduling data transmission on a candidate transmission location of a set of semi-persistent scheduling in a semi-persistent scheduling transmission period, calculating a HARQ process number according to a starting point of earliest candidate transmission location in the semi-persistent scheduling transmission period, or calculating a HARQ process number according to a starting point of the candidate transmission location occupied by the semi-persistent scheduling data actually transmitted in the semi-persistent scheduling transmission period.

Further, the method further comprises:

deactivating a part or all of the multiple sets of semi-persistent scheduling to be deactivated, according to the part or all of the multiple sets of semi-persistent scheduling to be deactivated indicated by at least one following bit field in the physical layer signaling:

a time domain resource assignment bit field; a mapping bit field of virtual resource block to physical resource; a HARQ process number bit field; a redundancy version bit field; a modulation coding scheme bit field; a frequency domain resource assignment bit field; a hybrid automatic repeat request acknowledgement timing (HARQ-ACK timing) bit field.

Further, the method further comprises:

performing any one operation of activating semi-persistent scheduling, deactivating semi-persistent scheduling, and modifying semi-persistent scheduling parameters on a UE according to a pre-configured physical layer signaling transmitted by the base station, wherein the UE has a pre-configured Radio Network Temporary Identity (RNTI), and the pre-configured physical layer signaling includes a bit corresponding to the UE, wherein the bit is used to indicate the semi-persistent scheduling and semi-persistent scheduling parameters corresponding to the UE.

Further, in the pre-configured physical layer signaling, there is at least one first bit field indicating common resource information of the UEs and at least one second bit field indicating predetermined resource information corresponding to the UE, wherein the UE occupies at least X bits in the second bit field, the X bits indicating 2X or 2X−1 sets of semi-persistent scheduling parameters, and when the X bits indicates 2X−1 sets of semi-persistent scheduling parameters, a predetermined state value of the X bits represents the deactivation of semi-persistent scheduling.

Further, determining at least one of the followings according to the physical layer signaling: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling, wherein, the physical layer signaling includes: a predetermined bit field, or a predetermined value of a predetermined bit field in the physical layer signaling; or determining a physical layer signaling whose RNTI is different from that of another physical layer signaling; or determining a physical layer signaling whose PDCCH search space and/or control resource set (CORESET) is different from that of another physical layer signaling.

Further, performing the semi-persistent scheduling data transmission based on the configuration information of the semi-persistent scheduling parameters, comprises:

the configuration information including a time information having a time unit, determining a location for the data transmission according to the time information, and performing the semi-persistent scheduling data transmission, wherein the time unit includes at least one of the following: second, millisecond, microsecond, femtosecond, nanosecond and picosecond.

Further, the configuration information including a time information having a time unit, determining a location for the data transmission according to the time information, and performing the semi-persistent scheduling data transmission comprises any of the following situations:

determining a data arrival time of the semi-persistent scheduling according to the configuration information, determining a data transmission symbol that is not earlier than the data arrival time and nearest to the data arrival time, and performing the semi-persistent scheduling data transmission by using the data transmission symbol as a starting point;

determining a data arrival time and a candidate transmission location of the semi-persistent scheduling according to the configuration information, determining a candidate transmission location that is not earlier than the data arrival time and nearest to the data arrival time, and performing the semi-persistent scheduling data transmission at the candidate transmission location that is not earlier than the data arrival time and nearest to the data arrival time;

determining the data arrival time, the candidate transmission location, and the candidate transmission resource of the semi-persistent scheduling according to the configuration information, determining a data transmission symbol that is not earlier than the data arrival time and nearest to the data arrival time, in the candidate transmission resource, and performing semi-persistent scheduling data transmission starting from the data transmission symbol to an end symbol of a candidate transmission location where the data transmission symbol is located;

determining a time window and a data arrival time of the semi-persistent scheduling according to the configuration information, determining a time window in which the semi-persistent scheduling data transmission is possible by using the data arrival time as a starting point, and when there is at least one candidate transmission location in the time window in which the semi-persistent scheduling data transmission is possible, performing the semi-persistent scheduling data transmission at the earliest candidate transmission location; and determining a time window and a data arrival time of the semi-persistent scheduling according to the configuration information, determining a time window in which the semi-persistent scheduling data transmission is possible by using the data arrival time as a starting point, and when there is at least one semi-persistent scheduling candidate transmission time domain resource in the time window in which the semi-persistent scheduling data transmission is possible, performing the semi-persistent scheduling data transmission on the earliest semi-persistent scheduling candidate transmission time domain resource.

FIG. 10 is a structure schematic diagram of a base station device according to another embodiment of the present application, as shown in FIG. 10, and the base station device 1000 includes a transmitting module 1001 and a first data transmission module 1002, in which:

the transmitting module 1001 is used to transmit a configuration information of semi-persistent scheduling parameters to a user equipment (UE), so that the UE performs semi-persistent scheduling data transmission based on the configuration information; and the first data transmission module 1002 is used to perform the semi-persistent scheduling data transmission based on the configuration information of the semi-persistent scheduling parameters.

Specifically, the transmitting module 1001 is used to transmit a high-level signaling to the UE, wherein the high-level signaling includes at least one set of semi-persistent scheduling and semi-persistent scheduling parameters corresponding to each set of semi-persistent scheduling; and to transmit a physical layer signaling to the UE, wherein the physical layer signaling is used to indicate at least one of the followings: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling.

Further, the high-level signaling includes at least one of the followings: the number of semi-persistent scheduling, an index of semi-persistent scheduling, the number of semi-persistent scheduling parameters corresponding to each set of semi-persistent scheduling, an index of activated semi-persistent scheduling, and activated semi-persistent scheduling parameters.

Further, the physical layer signaling is used to indicate to activate multiple sets of semi-persistent scheduling, the number of semi-persistent scheduling parameters corresponding to each set of semi-persistent scheduling is 2X, wherein X is used to indicate the number of bits of semi-persistent scheduling parameters of the set of semi-persistent scheduling in the physical layer signaling; or, the physical layer signaling is used to indicate to activate or deactivate multiple sets of semi-persistent scheduling, the number of semi-persistent scheduling parameters corresponding to each set of semi-persistent scheduling is 2X−1, wherein X is used to indicate the number of bits of semi-persistent scheduling parameters of the set of semi-persistent scheduling in the physical layer signaling, and a predetermined value of the X bits represents to deactivate the set of semi-persistent scheduling, and the remaining values of the X bits represent to activate one set of the semi-persistent scheduling parameters of the set of semi-persistent scheduling.

Further, the configuration information of the semi-persistent parameters comprises any of the followings:
multiple sets of semi-persistent scheduling, common parameters of the multiple sets of semi-persistent scheduling, and time domain resources corresponding to each set of semi-persistent scheduling;
multiple sets of semi-persistent scheduling, common parameters of the multiple sets of semi-persistent scheduling, a time offset between sets of semi-persistent scheduling, and number and/or index of the multiple sets of semi-persistent scheduling, time characteristic parameter in the common parameters applied to a first set of semi-persistent scheduling among multiple sets of semi-persistent scheduling;
multiple sets of semi-persistent scheduling, common parameters of the multiple sets of semi-persistent scheduling, and a time offset between sets of semi-persistent scheduling, time characteristic parameter in the common parameters applied to a first set of semi-persistent scheduling among multiple sets of semi-persistent scheduling; and
a set of semi-persistent scheduling, common parameters of the set of semi-persistent scheduling, and a time offset between candidate transmission locations of the set of semi-persistent scheduling, time characteristic parameter in the common parameters applied to a first candidate transmission location of the set of semi-persistent scheduling.

Further, the device further comprises an encoding module 1003 (not shown in figures), and the encoding module is used to perform any of the followings:
when the physical layer signaling includes a time domain resource indication information applied to the first candidate transmission location of the set of semi-persistent scheduling, and a time offset between candidate transmission locations, the time domain resource indication information is jointly encoded with the time offset;
when the physical layer signaling includes a time domain resource indication information applied to the first set of semi-persistent scheduling in the multiple sets of semi-persistent scheduling, and a time offset between sets of semi-persistent scheduling, the time domain resource indication information is jointly encoded with the time offset;
when the physical layer signaling includes a time domain resource indication information applied to the first candidate transmission location of the set of semi-persistent scheduling, a time offset between candidate transmission locations and a semi-persistent scheduling transmission period, the transmission period is jointly encoded with the time offset between candidate transmission locations, or the transmission period, the time offset between candidate transmission locations and the time domain resource of the first candidate transmission location are jointly encoded;
when the physical layer signaling includes a time domain resource indication information applied to the first set of semi-persistent scheduling of among multiple sets of semi-persistent scheduling, a time offset between sets of semi-persistent scheduling and a semi-persistent scheduling transmission period, the transmission period is jointly encoded with the time offset between sets of semi-persistent scheduling, or the transmission period, the time offset between sets of semi-persistent scheduling, and the time domain resource of the first set of semi-persistent scheduling are jointly encoded.

Further, the device further comprises a indicating module 1004 (not shown in figures), and the indicating module is used to indicate the time offset between the sets of semi-persistent scheduling and/or the transmission period of the semi-persistent scheduling, or indicate the time offset between the candidate transmission locations and/or the transmission period of semi-persistent scheduling, by at least one of the following bit fields in the physical layer signaling:
a bit field indicating a redundancy version;
a bit field indicating an HARQ process number; and
an independent bit field.

Further, the first data transmission module 1002 is used to, in a semi-persistent scheduling transmission period, attempt to perform the semi-persistent scheduling data transmission on resources of at least one set of semi-persistent scheduling, and determine to perform the semi-persistent scheduling data transmission on resources of one set of semi-persistent scheduling; or in a semi-persistent scheduling transmission period, attempt to perform the semi-persistent scheduling data transmission on at least one candidate transmission location of one set of semi-persistent scheduling, and determine to perform the semi-persistent scheduling data transmission on one candidate transmission location.

Further, the device further comprises a first computing module 1005, and the first computing module 1005 is used to:
when performing the semi-persistent scheduling data transmission on resources of a set of semi-persistent scheduling in a semi-persistent scheduling transmission period, calculate a HARQ process number according to the resources of earliest set of semi-persistent scheduling in the semi-persistent scheduling transmission period, or calculate a HARQ process number according to the resources of semi-persistent scheduling occupied by the semi-persistent scheduling data actually transmitted in the semi-persistent scheduling transmission period; and
when performing the semi-persistent scheduling data transmission on a candidate transmission location of a set of semi-persistent scheduling in a semi-persistent scheduling transmission period, calculate a HARQ process number according to a starting point of earliest candidate transmission location in the semi-persistent scheduling transmission period, or calculate a HARQ process number according to a starting point of the candidate transmission location occupied by the semi-persistent scheduling data actually transmitted in the semi-persistent scheduling transmission period.

Further, the indicating module 1004 further used to indicate a part or all of the multiple set of semi-persistent scheduling to be deactivated, by at least one following bit field in the physical layer signaling:
a time domain resource assignment bit field; a mapping bit field of virtual resource block to physical resource; a HARQ process number bit field; a redundancy version bit field; a modulation coding scheme bit field; a frequency domain resource assignment bit field; a hybrid automatic repeat request acknowledgement timing (HARQ-ACK timing) bit field.

Further, the device further comprises a first processing module 1006 (not shown in figures), and the first processing module 1006 used to perform any one operation of activating semi-persistent scheduling, deactivating semi-persistent scheduling, and modifying semi-persistent scheduling parameters on multiple UEs by a pre-configured physical layer signaling, wherein the multiple UEs have a same pre-configured Radio Network Temporary Identity (RNTI), and the pre-configured physical layer signaling includes a bit corresponding to each UE of the multiple UEs, wherein the bit is used to indicate the semi-persistent scheduling and semi-persistent scheduling parameters corresponding to the UE.

Further, in the first processing module 1006, there is at least one first bit field indicating common resource information of the multiple UEs in the pre-configured physical layer signaling, and at least one second bit field indicating predetermined resource information corresponding to each of the multiple UEs, wherein any of the UEs occupies at least X bits in the second bit field, the X bits indicating 2X or 2X−1 sets of semi-persistent scheduling parameters, and when the X bits indicates 2X−1 sets of semi-persistent scheduling parameters, a predetermined state value of the X bits represents the deactivation of semi-persistent scheduling.

Further, the indicating module 1004 is used to: when the physical layer signaling includes: a predetermined bit field, or a predetermined value of a predetermined bit field in the physical layer signaling, the physical layer signaling is used to indicate at least one of: at least one set of semi-persistent scheduling and one set of semi-persistent scheduling parameters of multiple set of semi-persistent scheduling parameters of each set of semi-persistent scheduling, activation and/or deactivation of multiple sets of semi-persistent scheduling; or configure different RNTIs for the physical layer signaling and another physical layer signaling; or configure different PDCCH search spaces and/or control resource sets (CORESET) for the physical layer signaling and another physical layer signaling.

Furtherly, the first data transmission module 1002 is used to, when the configuration information includes a time information having a time unit, determine a location for the data transmission according to the time information, and perform the semi-persistent scheduling data transmission, wherein the time unit includes at least one of the followings: second, millisecond, microsecond, femtosecond, nanosecond and picosecond.

Further, the first data transmission module 1002 is used to perform any of the following situations:

determining a data arrival time of the semi-persistent scheduling according to the configuration information, determining a data transmission symbol that is not earlier than the data arrival time and nearest to the data arrival time, and performing semi-persistent scheduling data transmission by using the data transmission symbol as a starting point;

determining a data arrival time and a candidate transmission location of the semi-persistent scheduling according to the configuration information, determining a candidate transmission location that is not earlier than the data arrival time and nearest to the data arrival time, and performing the semi-persistent scheduling data transmission at the candidate transmission location that is not earlier than the data arrival time and nearest to the data arrival time;

determining the data arrival time, the candidate transmission location, and the candidate transmission resource of the semi-persistent scheduling according to the configuration information, determining a data transmission symbol that is not earlier than the data arrival time and nearest to the data arrival time, in the candidate transmission resource, and performing the semi-persistent scheduling data transmission starting from the data transmission symbol to an end symbol of a candidate transmission location where the data transmission symbol is located;

determining a time window and a data arrival time of the semi-persistent scheduling according to the configuration information, determining a time window in which the semi-persistent scheduling data transmission is possible by using the data arrival time as a starting point, and when there is at least one candidate transmission location in the time window in which the semi-persistent scheduling data transmission is possible, performing the semi-persistent scheduling data transmission at the earliest candidate transmission location; and determining a time window and a data arrival time of the semi-persistent scheduling according to the configuration information, determining a time window in which the semi-persistent scheduling data transmission is possible by using the data arrival time as a starting point, and when there is at least one semi-persistent scheduling candidate transmission time domain resource in the time window in which the semi-persistent scheduling data transmission is possible, performing the semi-persistent scheduling data transmission on the earliest semi-persistent scheduling candidate transmission time domain resource.

In the semi-persistent scheduling method provided by the embodiment of the present application, by transmitting configuration information of semi-persistent scheduling parameters to the UE, the UE performs the semi-persistent scheduling data transmission based on the configuration information; and the base station performs the semi-persistent scheduling data transmission based on the configuration information of the semi-persistent scheduling parameters, thereby meeting the low-latency requirements of the URLLC, so that existing semi-persistent scheduling transmission mechanism can support higher low-latency requirements, and introduce multiple semi-persistent scheduling configuration at the same time and assign different time-frequency resources for each semi-persistent scheduling configuration, thus finally multiple types of services can be simultaneously supported.

FIG. 11 is a structure schematic diagram of a user equipment according to another embodiment of the present application, as shown in FIG. 11, and the user equipment 1100 may include a receiving module 1101 and a second data transmission module 1102, in which:

the receiving module 1101 is used to receive a configuration information of semi-persistent scheduling parameters transmitted by a base station;

the second data transmission module 1102 is used to perform semi-persistent scheduling data transmission based on the configuration information.

Specifically, the receiving module 1101 is used to receive a high-level signaling transmitted by the base station, wherein the high-level signaling includes at least one set of semi-persistent scheduling and semi-persistent scheduling parameters corresponding to each set of semi-persistent scheduling; and receive a physical layer signaling transmitted by the base station, wherein the physical layer signaling is used to indicate at least one of the following: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling.

Furtherly, the second data transmission module 1102 is used to determine at least one of the followings: the number of semi-persistent scheduling, an index of semi-persistent scheduling, the number of semi-persistent scheduling parameters corresponding to each set of semi-persistent scheduling, an index of activated semi-persistent scheduling, and activated semi-persistent scheduling parameters, according to the high-level signaling.

Further, the second data transmission module 1102 is used to determine to activate multiple sets of semi-persistent scheduling and semi-persistent scheduling parameters of each set of semi-persistent scheduling according to the physical layer singling, and perform the semi-persistent data transmission according to the semi-persistent scheduling parameters, wherein the number of semi-persistent scheduling parameters corresponding to each set of semi-persistent scheduling is 2X, wherein X is used to indicate the number of bits of semi-persistent scheduling parameters of the set of semi-persistent scheduling in the physical layer signaling; or determine to activate or deactivate multiple sets of semi-persistent scheduling according to the physical layer signaling and perform the semi-persistent data transmission according to the semi-persistent scheduling parameters, wherein the number of semi-persistent scheduling parameters corresponding to each set of semi-persistent scheduling is 2X−1, wherein X is used to indicate the number of bits of semi-persistent scheduling parameters of the set of semi-persistent scheduling in the physical layer signaling, and a predetermined value of the X bits represents to deactivate the set of semi-persistent scheduling, and the remaining values of the X bits represent to activate one set of the semi-persistent scheduling parameters of the set of semi-persistent scheduling.

Further, the configuration information of the semi-persistent parameters comprises one of the following:
  multiple sets of semi-persistent scheduling, common parameters of the multiple sets of semi-persistent scheduling, and time domain resources corresponding to each set of semi-persistent scheduling;
  multiple sets of semi-persistent scheduling, common parameters of the multiple sets of semi-persistent scheduling, a time offset between sets of semi-persistent scheduling, and number and/or index of the multiple sets of semi-persistent scheduling, time characteristic parameter in the common parameters applied to a first set of semi-persistent scheduling among multiple sets of semi-persistent scheduling;
  multiple sets of semi-persistent scheduling, common parameters of the multiple sets of semi-persistent scheduling, and a time offset between sets of semi-persistent scheduling, time characteristic parameter in the common parameters applied to a first set of semi-persistent scheduling among multiple sets of semi-persistent scheduling;
  a set of semi-persistent scheduling, common parameters of the set of semi-persistent scheduling, and a time offset between candidate transmission locations of the set of semi-persistent scheduling, time characteristic parameter in the common parameters applied to a first candidate transmission location of the set of semi-persistent scheduling.

Further, the receiving module 1101 is further used to perform any of the followings:
  receiving joint encoding of the time domain resource indication information and the time offset between candidate transmission locations, wherein the physical layer signaling includes time domain resource indication information applied to the first candidate transmission location of the set of semi-persistent scheduling, and a time offset between candidate transmission locations;
  receiving joint encoding of the time domain resource indication information and the time offset between sets of semi-persistent scheduling, wherein the physical layer signaling includes time domain resource indication information applied to the first set of semi-persistent scheduling in the multiple sets of semi-persistent scheduling, and a time offset between sets of semi-persistent scheduling;
  receiving joint encoding of the transmission period and the time offset between candidate transmission locations, or receiving joint encoding of the transmission period, the time offset between candidate transmission locations and the time domain resource of the first candidate transmission location, wherein the physical layer signaling includes time domain resource indication information applied to the first candidate transmission location of the set of semi-persistent scheduling, a time offset between candidate transmission locations and a semi-persistent scheduling transmission period; and
  receiving joint encoding of the transmission period and the time offset between sets of semi-persistent scheduling, or receiving joint encoding of the transmission period, the time offset between sets of semi-persistent scheduling and the time domain resource of the first set of semi-persistent scheduling, wherein the physical layer signaling includes time domain resource indication information applied to the first set of semi-persistent scheduling of the multiple sets of semi-persistent scheduling, a time offset between sets of semi-persistent scheduling and a semi-persistent scheduling transmission period.

Furtherly, the device further comprises a first determining module 1103 (not shown in figures), and the determining module 1103 is used to determine the time offset between the sets of semi-persistent scheduling and/or the transmission period of the semi-persistent scheduling, or determine the time offset between the candidate transmission locations and/or the transmission period of semi-persistent scheduling, according to at least one of the following bit fields in the physical layer signaling:
  a bit field indicating a redundancy version;
  a bit field indicating an HARQ process number; and
  an independent bit field.

Further, the second data transmission module 1102 is used to, in a semi-persistent scheduling transmission period, attempt to perform the semi-persistent scheduling data transmission on resources of at least one set of semi-persistent scheduling, and determine to perform the semi-persistent scheduling data transmission on resources of one set of semi-persistent scheduling; or in a semi-persistent scheduling transmission period, attempt to perform the semi-persistent scheduling data transmission on at least one candidate transmission location of one set of semi-persistent scheduling, and determine to perform the semi-persistent scheduling data transmission on one candidate transmission location.

Further, the device further comprises a second computing module 1104 (not shown in figures), and the second computing module 1104 is used to: when performing the semi-persistent scheduling data transmission on resources of a set of semi-persistent scheduling in a semi-persistent scheduling transmission period, calculate a HARQ process number according to the resources of earliest set of semi-persistent scheduling in the semi-persistent scheduling transmission period, or calculate a HARQ process number according to the resources of semi-persistent scheduling occupied by the semi-persistent scheduling data actually transmitted in the semi-persistent scheduling transmission period; or, when performing the semi-persistent scheduling data transmission on a candidate transmission location of a set of semi-persistent scheduling in a semi-persistent scheduling transmission period, calculate a HARQ process number according to a starting point of earliest candidate transmission location in the semi-persistent scheduling transmission period, or calculate a HARQ process number according to a starting point of the candidate transmission location occupied by the semi-persistent scheduling data actually transmitted in the semi-persistent scheduling transmission period.

Further, the device further comprises a second deactivating module 1105 (not shown in figures), and the second deactivating module 1105 is used to deactivate a part or all of the multiple set of semi-persistent scheduling to be deactivated, according to the part or all of the multiple set of semi-persistent scheduling to be deactivated indicated by at least one following bit field in the physical layer signaling:
  a time domain resource assignment bit field; a mapping bit field of virtual resource block to physical resource; a HARQ process number bit field; a redundancy version bit field; a modulation coding scheme bit field; a frequency domain resource assignment bit field; a hybrid automatic repeat request acknowledgement timing (HARQ-ACK timing) bit field.

Further, the device further comprises a second processing module 1106 (not shown in figures), and the second processing module 1106 is used to perform any one operation of activating semi-persistent scheduling, deactivating semi-persistent scheduling, and modifying semi-persistent scheduling parameters on a UE according to a pre-configured physical layer signaling transmitted by the base station,
  wherein the UE has a pre-configured Radio Network Temporary Identity (RNTI), and the pre-configured physical layer signaling includes a bit corresponding to the UE, wherein the bit is used to indicate the semi-persistent scheduling and semi-persistent scheduling parameters corresponding to the UE.

Further, in the pre-configured physical layer signaling, there is at least one first bit field indicating common resource information of the UEs and at least one second bit field indicating predetermined resource information corresponding to the UE,
  wherein the UE occupies at least X bits in the second bit field, the X bits indicating 2X or 2X–1 sets of semi-persistent scheduling parameters, and when the X bits indicates 2X–1 sets of semi-persistent scheduling parameters, a predetermined state value of the X bits represents the deactivation of semi-persistent scheduling.

Further, the device further comprises a second determining module 1107 (not shown in figures), and the second determining module 1107 is used to determine at least one of the following according to the physical layer signaling: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling, wherein, the physical layer signaling includes: a predetermined bit field, or a predetermined value of a predetermined bit field in the physical layer signaling; or determine a physical layer signaling whose RNTI is different from that of another physical layer signaling; or determine a physical layer signaling whose PDCCH search space and/or control resource set (CORESET) is different from that of another physical layer signaling.

Furthermore, the second data transmission module 1102 is used to, when the configuration information including a time information having a time unit, determine a location for the data transmission according to the time information, and perform the semi-persistent scheduling data transmission, wherein the time unit includes at least one of the followings: second, millisecond, microsecond, femtosecond, nanosecond and picosecond.

Further, the second data transmission module 1102 is used to perform any of the following operations:
  determining a data arrival time of the semi-persistent scheduling according to the configuration information, determining a data transmission symbol that is not earlier than the data arrival time and nearest to the data arrival time, and performing the semi-persistent scheduling data transmission by using the data transmission symbol as a starting point;
  determining a data arrival time and a candidate transmission location of the semi-persistent scheduling according to the configuration information, determining a candidate transmission location that is not earlier than the data arrival time and nearest to the data arrival time, and performing the semi-persistent scheduling data transmission at the candidate transmission location that is not earlier than the data arrival time and nearest to the data arrival time;
  determining the data arrival time, the candidate transmission location, and the candidate transmission resource of the semi-persistent scheduling according to the configuration information, determining a data transmission symbol that is not earlier than the data arrival time and nearest to the data arrival time, in the candidate transmission resource, and performing the semi-persistent scheduling data transmission starting from the data transmission symbol to an end symbol of a candidate transmission location where the data transmission symbol is located;
  determining a time window and a data arrival time of the semi-persistent scheduling according to the configuration information, determining a time window in which the semi-persistent scheduling data transmission is possible by using the data arrival time as a starting point, and when there is at least one candidate transmission location in the time window in which the semi-persistent scheduling data transmission is possible, performing the semi-persistent scheduling data transmission at the earliest candidate transmission location; and
  determining a time window and a data arrival time of the semi-persistent scheduling according to the configuration information, determining a time window in which the semi-persistent scheduling data transmission is possible by using the data arrival time as a starting point, and when there is at least one semi-persistent scheduling candidate transmission time domain resource in the time window in which the semi-persistent scheduling data transmission is possible, performing the semi-persistent scheduling data transmission on the earliest semi-persistent scheduling candidate transmission time domain resource.

Yet another embodiment of the present invention provides an electronic device comprising: a processor; and a memory, configured to store machine readable instructions that, when executed by the processor, cause the processor to perform the semi-persistent scheduling method described above.

FIG. 12 schematic shows a block diagram of a computing system that can be used to implement the user equipment disclosed in the embodiments of the present disclosure.

As shown in FIG. 12, a computer system 1200 includes a processor 1210, a computer readable storage medium 1220, an output interface 1230, and an input interface 1240. The computer system 1200 can perform the method above-described with reference to FIG. 2 or FIG. 6, to configure a reference signal and perform data transmission based on the reference signal.

Specifically, the processor 1210 can include, for example, a general purpose microprocessor, an instruction set processor and/or a related chipset and/or a special purpose microprocessor (e.g., an application specific integrated circuit (ASIC)), and the like. The processor 1210 may also include an onboard memory for caching purposes. The processor 1210 may be a single processing unit or a plurality of processing units for performing different actions of the method flow described with reference to FIG. 2 or FIG. 6.

The computer readable storage medium 1220, for example, can be any medium that can contain, store, communicate, propagate or transport the instructions. For example, a readable storage medium may include, but is not limited to, an electronic, magnetic, optical, electromagnetic, infrared, or semiconductor system, apparatus, device, or propagation medium. Specific examples of the readable storage medium include: a magnetic storage device such as a magnetic tape or a hard disk (HDD); an optical storage device such as a compact disk (CD-ROM); a memory such as a random access memory (RAM) or a flash memory; and/or a wired/wireless communication link.

The computer readable storage medium 1220 can include a computer program, which can include code/computer executable instructions that, when executed by the processor 1210, cause the processor 1210 to perform, for example, the method flow described above in connection with FIG. 2 or FIG. 6 and any variations thereof.

The computer program can be configured to have, for example, computer program code comprising a computer program module. For example, in an example embodiment, the code in a computer program can include one or more program modules, for example, including module 1, module 2, It should be noted that the division manner and the number of modules are not fixed, and those skilled in the art may use suitable program modules or program module combinations according to actual situations. When these program module combinations are executed by the processor 1210, the processor 910 may be perform the method flow, for example, described above in connection with FIG. 2 or FIG. 6, and any variations thereof.

According to an embodiment of the present disclosure, the processor 1210 may use the output interface 1230 and the input interface 1240 to perform the method flow described above in connection with FIG. 2 or FIG. 6 and any variations thereof.

According to various embodiment of the present disclosure, a method performed by a base station comprises transmitting a configuration information of semi-persistent scheduling parameters to a user equipment (UE), so that the UE performs a semi-persistent scheduling data transmission based on the configuration information; and performing the semi-persistent scheduling data transmission based on the configuration information of the semi-persistent scheduling parameters.

According to various embodiment of the present disclosure, the transmitting a configuration information of semi-persistent scheduling parameters to UE, comprises transmitting a high-level signaling to the UE, wherein the high-level signaling includes at least one set of semi-persistent scheduling and the semi-persistent scheduling parameters corresponding to each of the set of semi-persistent scheduling; and transmitting a physical layer signaling to the UE, wherein the physical layer signaling is used to indicate at least one of the followings: at least one set of semi-persistent scheduling and one set of semi-persistent scheduling parameters among multiple sets of semi-persistent scheduling parameters of each of the set of semi-persistent scheduling, activation and/or deactivation of the multiple sets of semi-persistent scheduling.

According to various embodiment of the present disclosure, the high-level signaling includes at least one of the followings: a number of semi-persistent scheduling, an index of semi-persistent scheduling, a number of semi-persistent scheduling parameters corresponding to each set of semi-persistent scheduling, an index of activated semi-persistent scheduling, and activated semi-persistent scheduling parameters.

According to various embodiment of the present disclosure, the physical layer signaling is used to indicate to activate multiple sets of semi-persistent scheduling, a total number of semi-persistent scheduling parameters corresponding to each set of semi-persistent scheduling is 2X, wherein X is used to indicate a total number of bits of semi-persistent scheduling parameters of the set of semi-persistent scheduling in the physical layer signaling; or the physical layer signaling is used to indicate to activate and/or deactivate multiple sets of semi-persistent scheduling, a total number of semi-persistent scheduling parameters corresponding to each set of semi-persistent scheduling is 2X−1, wherein X is used to indicate a total number of bits of semi-persistent scheduling parameters of the set of semi-persistent scheduling in the physical layer signaling, and a predetermined value of the X bits represents to deactivate the set of semi-persistent scheduling, and a remaining values of the X bits represent to activate one set of the semi-persistent scheduling parameters of the set of semi-persistent scheduling.

According to various embodiment of the present disclosure, the configuration information of the semi-persistent parameters comprises multiple sets of semi-persistent scheduling, common parameters of the multiple sets of semi-persistent scheduling, and time domain resources corresponding to each set of semi-persistent scheduling, multiple sets of semi-persistent scheduling, common parameters of the multiple sets of semi-persistent scheduling, a time offset between sets of semi-persistent scheduling, and number and/or index of the multiple sets of semi-persistent scheduling, wherein a time characteristic parameter in the common parameters is applied to a first set of semi-persistent scheduling among the multiple sets of semi-persistent scheduling, multiple sets of semi-persistent scheduling, common parameters of the multiple sets of semi-persistent scheduling, and a time offset between sets of semi-persistent scheduling, wherein a time characteristic parameter in the common parameters is applied to a first set of semi-persistent scheduling among the multiple sets of semi-persistent scheduling, a set of semi-persistent scheduling, common parameters of the set of semi-persistent scheduling, and a time offset between candidate transmission locations of the set of semi-persistent scheduling, wherein a time characteristic parameter in the common parameters is applied to a first candidate transmission location of the set of semi-persistent scheduling.

According to various embodiment of the present disclosure, when the physical layer signaling includes a time domain resource indication information applied to a first candidate transmission location of the set of semi-persistent scheduling, and a time offset between candidate transmission locations, the time domain resource indication information is jointly encoded with the time offset;
  when the physical layer signaling includes a time domain resource indication information applied to the first set of semi-persistent scheduling among the multiple sets of semi-persistent scheduling, and a time offset between sets of semi-persistent scheduling, the time domain resource indication information is jointly encoded with the time offset;
  when the physical layer signaling includes a time domain resource indication information applied to the first candidate transmission location of the set of semi-persistent scheduling, a time offset between candidate transmission locations and a semi-persistent scheduling transmission period, the transmission period is jointly encoded with the time offset between candidate transmission locations, or the transmission period, the time offset between candidate transmission locations and the time domain resource of the first candidate transmission location are jointly encoded;
  when the physical layer signaling includes a time domain resource indication information applied to the first set of semi-persistent scheduling among the multiple sets of semi-persistent scheduling, a time offset between sets of semi-persistent scheduling and a semi-persistent scheduling transmission period, the transmission period is jointly encoded with the time offset between sets of semi-persistent scheduling, or the transmission period, the time offset between sets of semi-persistent scheduling, and the time domain resource of the first set of semi-persistent scheduling are jointly encoded.

According to various embodiment of the present disclosure, indicating the time offset between the sets of semi-persistent scheduling and/or the transmission period of the semi-persistent scheduling, or indicating the time offset between the candidate transmission locations and/or the transmission period of the semi-persistent scheduling, by at least one of the following bit fields in the physical layer signaling, a bit field indicating a redundancy version, a bit field indicating a hybrid automatic repeat request (HARQ) process number; and: an independent bit field.

According to various embodiment of the present disclosure, the performing the semi-persistent scheduling data transmission based on the configuration information of the semi-persistent scheduling parameters, comprises in a semi-persistent scheduling transmission period, attempting to perform the semi-persistent scheduling data transmission on resources of at least one set of semi-persistent scheduling, and determining to perform the semi-persistent scheduling data transmission on resources of one set of semi-persistent scheduling; or in a semi-persistent scheduling transmission period, attempting to perform the semi-persistent scheduling data transmission on at least one candidate transmission location of one set of semi-persistent scheduling, and determining to perform the semi-persistent scheduling data transmission on one candidate transmission location.

According to various embodiment of the present disclosure, when performing the semi-persistent scheduling data transmission on resources of a set of semi-persistent scheduling in a semi-persistent scheduling transmission period, calculating a hybrid automatic repeat request (HARQ) process number according to the resources of earliest set of semi-persistent scheduling in the semi-persistent scheduling transmission period, or calculating a HARQ process number according to the resources of semi-persistent scheduling occupied by the semi-persistent scheduling data actually transmitted in the semi-persistent scheduling transmission period; and when performing the semi-persistent scheduling data transmission on a candidate transmission location of a set of semi-persistent scheduling in a semi-persistent scheduling transmission period, calculating a HARQ process number according to a starting point of earliest candidate transmission location in the semi-persistent scheduling transmission period, or calculating a HARQ process number according to a starting point of the candidate transmission location occupied by the semi-persistent scheduling data actually transmitted in the semi-persistent scheduling transmission period.

According to various embodiment of the present disclosure, the indicating a part or all of the multiple sets of semi-persistent scheduling to be deactivated, by at least one following bit field in the physical layer signaling, a time domain resource assignment bit field; a mapping bit field of virtual resource block to physical resource; a hybrid automatic repeat request (HARQ) process number bit field; a redundancy version bit field; a modulation coding scheme bit field; a frequency domain resource assignment bit field; a hybrid automatic repeat request acknowledgement timing (HARQ-ACK timing) bit field.

According to various embodiment of the present disclosure, performing any one operation of activating the semi-persistent scheduling, deactivating the semi-persistent scheduling, and modifying the semi-persistent scheduling parameters on multiple UEs by a pre-configured physical layer signaling, wherein the multiple UEs have a same pre-configured radio network temporary identity (RNTI), and the pre-configured physical layer signaling includes a bit corresponding to each of the multiple UEs, wherein the bit is used to indicate the semi-persistent scheduling and semi-persistent scheduling parameters corresponding to the UE.

According to various embodiment of the present disclosure, wherein, performing any one operation of activating the semi-persistent scheduling, deactivating the semi-persistent scheduling, and modifying the semi-persistent scheduling parameters on multiple UEs by a pre-configured physical layer signaling, comprises there is at least one first bit field indicating common resource information of the multiple UEs in the pre-configured physical layer signaling, and at least one second bit field indicates predetermined resource information corresponding to each of the multiple UEs, wherein any of the UEs occupies at least X bits in the second bit field, the X bits indicating 2X or 2X−1 sets of semi-persistent scheduling parameters, and when the X bits indicates 2X−1 sets of semi-persistent scheduling parameters, a predetermined state value of the X bits represents the deactivation of semi-persistent scheduling.

According to various embodiment of the present disclosure, wherein, when the physical layer signaling includes: a predetermined bit field, or a predetermined value of the predetermined bit field in the physical layer signaling, the physical layer signaling is used to indicate at least one of followings: at least one set of semi-persistent scheduling and one set of semi-persistent scheduling parameters among multiple sets of semi-persistent scheduling parameters of each set of semi-persistent scheduling, activation and/or deactivation of multiple sets of semi-persistent scheduling; or configuring different RNTIs for the physical layer signaling and another physical layer signaling; or configuring different physical downlink control channel (PDCCH) search spaces and/or control resource sets (CORESET) for the physical layer signaling and another physical layer signaling.

According to various embodiment of the present disclosure, wherein, performing the semi-persistent scheduling data transmission based on the configuration information of the semi-persistent scheduling parameters, comprises the configuration information including a time information having a time unit, determining a location for the data transmission according to the time information, and performing the semi-persistent scheduling data transmission, wherein the time unit includes at least one of the following: second, millisecond, microsecond, femtosecond, nanosecond and picosecond.

According to various embodiment of the present disclosure, wherein, the configuration information including a time information having a time unit, determining a location for the data transmission according to the time information, and performing the semi-persistent scheduling data transmission, comprises any of the following situations determining a data arrival time of the semi-persistent scheduling according to the configuration information, determining a data transmission symbol that is not earlier than the data arrival time and nearest to the data arrival time, and performing the semi-persistent scheduling data transmission by using the data transmission symbol as a starting point, determining a data arrival time and a candidate transmission location of the semi-persistent scheduling according to the configuration information, determining a candidate transmission location that is not earlier than the data arrival time and nearest to the data arrival time, and performing the semi-persistent scheduling data transmission at the candidate transmission location that is not earlier than the data arrival time and nearest to the data arrival time, determining the data arrival time, the candidate transmission location, and the candidate transmission resource of the semi-persistent scheduling according to the configuration information, determining a data transmission symbol that is not earlier than the data arrival time and nearest to the data arrival time, in the candidate transmission resource, and performing the semi-persistent scheduling data transmission starting from the data transmission symbol to an end symbol of a candidate transmission location where the data transmission symbol is located, determining a time window and a data arrival time of the semi-persistent scheduling according to the configuration information, determining a time window in which the semi-persistent scheduling data transmission is possible by using the data arrival time as a starting point, and when there is at least one candidate transmission location in the time window in which the semi-persistent scheduling data transmission is possible, performing the semi-persistent scheduling data transmission at the earliest candidate transmission location; and determining a time window and a data arrival time of the semi-persistent scheduling according to the configuration information, determining a time window in which the semi-persistent scheduling data transmission is possible by using the data arrival time as a starting point, and when there is at least one semi-persistent scheduling candidate transmission time domain resource in the time window in which the semi-persistent scheduling data transmission is possible, performing the semi-persistent scheduling data transmission on the earliest semi-persistent scheduling candidate transmission time domain resource.

It should be understood that although the various steps in the flowchart of the drawings are sequentially displayed as indicated by the arrows, these steps are not necessarily performed in the order indicated by the arrows. Unless explicitly stated herein, the execution of these steps is not strictly limited, and may be performed in other orders. Moreover, at least some of the steps in the flowchart of the drawings may include a plurality of sub-steps or stages, which are not necessarily performed at the same time, but may be executed at different times, and the execution order thereof is not necessarily performed sequentially, but may be performed in turn or alternately with at least a portion of other steps or sub-steps or stages of other steps.

The above description is only some implementations of the present application, and it should be noted that those skilled in the art can also make some improvements and modification without departing from the principle of the present application, and the improvements and modification should be considered as the scope of protection of this application.

The invention claimed is:

1. A method performed by a user equipment (UE) in a wireless communication system, the method comprising:
receiving, from a base station (BS) via a higher layer signaling, configuration information on at least one configured grant (CG) to be deactivated among a plurality of CGs;
receiving, from the BS, downlink control information (DCI) including a hybrid automatic repeat and request (HARQ) process number field, wherein a value of the HARQ process number field corresponds to the at least one CG to be deactivated; and
transmitting, to the BS, a medium access control (MAC) control element (CE) for confirming the at least one CG,
wherein the MAC CE includes a bitmap comprising one or more a number of bits corresponding to the at least one CG,
wherein a subheader of the MAC CE includes a logical channel identifier (LCID) value indicating the MAC CE for confirming the at least one CG,
wherein all of a redundancy version field, a modulation and coding scheme field, and a frequency domain resource assignment field included in the DCI are used to validate the DCI, and
wherein the HARQ process number field in the DCI is not used to validate the DCI.

2. The method of claim 1, wherein the at least one CG configurations to be deactivated is combined into $2^M$CG configuration, wherein the HARQ process number field includes M bits, wherein the M is positive integer, and wherein each of the M bits is corresponding to the $2^M$CG configuration.

3. The method of claim 1, wherein the at least one CG is simultaneously deactivated based on the DCI.

4. A method performed by a base station (BS) in a wireless communication system, the method comprising:
transmitting, to a user equipment (UE) via a higher layer signaling, configuration information on at least one configured grant (CG) to be deactivated among a plurality of CGs;
transmitting, to the UE, downlink control information (DCI) including a hybrid automatic repeat and request (HARQ) process number field, wherein a value of the HARQ process number field corresponds to the at least one CG to be deactivated; and receiving, from the UE, a medium access control (MAC) control element (CE) for confirming the at least one CG, wherein the MAC CE includes a bitmap comprising one or more bits corresponding to the at least one CG, wherein a subheader of the MAC CE includes a logical channel identifier (LCID) value indicating the MAC CE for confirming the at least one CG, wherein all of a redundancy version field, a modulation and coding scheme field, and a frequency domain resource assignment field included in the DCI are used to validate the DCI, and wherein the HARQ process number field in the DCI is not used to validate the DCI.

5. The method of claim 4, wherein the at least one CG configurations to be deactivated is combined into $2^M$ CG configuration, wherein the HARQ process number field includes M bits, wherein the M is positive integer, and wherein each of the M bits is corresponding to the $2^M$ CG configuration.

6. The method of claim 4, wherein the at least one CG is simultaneously deactivated based on the DCI.

7. A user equipment (UE) in a wireless communication system, the UE comprising:

a transceiver; and a processor coupled with the transceiver and configured to:

receive, from a base station (BS) via a higher layer signaling, configuration information on at least one configured grant (CG) to be deactivated among a plurality of CGs;

receive, from the BS, downlink control information (DCI) including a hybrid automatic repeat and request (HARQ) process number field, wherein a value of the HARQ process number field corresponds to the at least one CG to be deactivated; and transmit, to the BS, a medium access control (MAC) control element (CE) for confirming the at least one CG, wherein the MAC CE includes a bitmap comprising one or more bits corresponding to the at least one CG, wherein a subheader of the MAC CE includes a logical channel identifier (LCID) value indicating the MAC CE for confirming the at least one CG, wherein all of a redundancy version field, a modulation and coding scheme field, and a frequency domain resource assignment field included in the DCI are used to validate the DCI, and wherein the HARQ process number field in the DCI is not used to validate the DCI.

8. The user equipment of claim 7, wherein the at least one CG configurations to be deactivated is combined into $2^M$ CG configuration, wherein the HARQ process number field includes M bits, wherein the M is positive integer, and wherein each of the M bits is corresponding to the $2^M$ CG configuration.

9. The user equipment of claim 7, wherein the at least one CG is simultaneously deactivated.

10. A base station (BS) in a wireless communication system, the BS comprising:

a transceiver; and a processor operably connected to the transceiver and configured to:

transmit, to a user equipment (UE) via a higher layer signaling, configuration information on at least one configured grant (CG) to be deactivated among a plurality of CGs;

transmit, to the UE, a downlink control information (DCI) including a hybrid automatic repeat and request (HARQ) process number field, wherein a value of the HARQ process number field corresponds to the at least one CG to be deactivated; and receive, from the UE, a medium access control (MAC) control element (CE) for confirming the at least one CG, wherein the MAC CE includes a bitmap comprising one or more bits corresponding to the at least one CG, wherein a subheader of the MAC CE includes a logical channel identifier (LCID) value indicating the MAC CE for confirming the at least one CG, wherein all of a redundancy version field, a modulation and coding scheme field, and a frequency domain resource assignment field included in the DCI are used to validate the DCI, and wherein the HARQ process number field in the DCI is not used to validate the DCI.

* * * * *

UNITED STATES PATENT AND TRADEMARK OFFICE
CERTIFICATE OF CORRECTION

| | | |
|---|---|---|
| PATENT NO. | : 12,284,041 B2 | |
| APPLICATION NO. | : 17/593946 | |
| DATED | : April 22, 2025 | |
| INVENTOR(S) | : Wang et al. | |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 429 days.

Signed and Sealed this
Sixteenth Day of December, 2025

John A. Squires
*Director of the United States Patent and Trademark Office*